US011392718B1

(12) United States Patent
Westmoreland et al.

(10) Patent No.: US 11,392,718 B1
(45) Date of Patent: Jul. 19, 2022

(54) METHOD AND SYSTEM FOR DETERMINING TRANSFER OF ASYNCHRONOUS CORRELATION OF DATA ENTRIES IN SPATIAL INSTANCES OF HETEROGENEOUS DATABASES

(71) Applicant: Proof of Concept, LLC, Austin, TX (US)

(72) Inventors: Andrew B. Westmoreland, Austin, TX (US); Timothy Hanus, Austin, TX (US)

( * ) Notice: Subject to any disclaimer, the term of this patent is extended or adjusted under 35 U.S.C. 154(b) by 337 days.

(21) Appl. No.: 16/702,337

(22) Filed: Dec. 3, 2019

Related U.S. Application Data

(60) Provisional application No. 62/774,692, filed on Dec. 3, 2018.

(51) Int. Cl.
*G06F 21/62* (2013.01)
*H04L 67/02* (2022.01)
*H04L 67/306* (2022.01)
*H04L 9/40* (2022.01)
*H04L 67/146* (2022.01)

(52) U.S. Cl.
CPC ...... *G06F 21/6254* (2013.01); *G06F 21/6263* (2013.01); *H04L 63/0421* (2013.01); *H04L 67/02* (2013.01); *H04L 67/146* (2013.01); *H04L 67/306* (2013.01)

(58) Field of Classification Search
CPC ............ G06F 21/6254; G06F 21/6263; H04L 63/0421; H04L 67/02; H04L 67/146; H04L 67/306
See application file for complete search history.

(56) References Cited

U.S. PATENT DOCUMENTS

| 6,112,207 | A | 8/2000 | Nori et al. | |
|---|---|---|---|---|
| 11,263,283 | B1 | 3/2022 | Westmoreland et al. | |
| 2002/0120871 | A1* | 8/2002 | Watkins | H04L 63/126 726/23 |
| 2007/0289002 | A1* | 12/2007 | van der Horst | G06F 21/42 713/185 |
| 2011/0138445 | A1 | 6/2011 | Chasen et al. | |
| 2011/0314526 | A1* | 12/2011 | Valentine | H04L 9/3231 726/6 |
| 2012/0124027 | A1 | 5/2012 | Hnatio | |
| 2013/0226863 | A1* | 8/2013 | Jonker | H04L 43/028 707/723 |

(Continued)

OTHER PUBLICATIONS

Westmoreland, Andrew B., et al., "Method and System for Asynchronous Correlation of Data Entries in Spatially Separated Instances of Heterogenous Databases" filed Sep. 7, 2017, U.S. Appl. No. 62/555,182.

(Continued)

*Primary Examiner* — Arvin Eskandarnia

(57) ABSTRACT

A computing system receives a data piece from an electronic device. The data piece includes one or more items of anonymous personal identification information. The computing system identifies an electronic address associated with the data piece. The computing system accesses the one or more servers to identify one or more client systems permitted to transmit data to the electronic device based on the electronic address. The computing system transmits the data piece to the one or more client systems permitted to transmit data to the electronic device.

16 Claims, 7 Drawing Sheets

(56) References Cited

U.S. PATENT DOCUMENTS

| | | | | |
|---|---|---|---|---|
| 2015/0244681 | A1* | 8/2015 | Blumenfeld | H04L 9/30 713/168 |
| 2016/0261594 | A1* | 9/2016 | Vishwanath | H04L 51/24 |
| 2017/0034132 | A1* | 2/2017 | Pambuccian | G06F 21/6263 |
| 2018/0152449 | A1* | 5/2018 | Vishwanath | H04L 67/306 |
| 2019/0238515 | A1* | 8/2019 | Dodd | H04L 63/0407 |

OTHER PUBLICATIONS

"Westmoreland, Andrew B., et al., "Method and System for Asynchrononous Correlation of Data Entries in Spatial Instances of Heterogeneous Databases" filed Jun. 1, 2018, U.S. Appl. No. 32/679,389."

Westmoreland, Andrew B., et al., "Method and System for Data Collection and Aggregation in Heterogeneous Databases" filed Jun. 1, 2018, U.S. Appl. No. 62/679,427.

Westmoreland, Andrew B., et al., "Method and System for Asynchronous Correlation of Data Entries in Spatial Instances of Heterogeneous Databases" filed Jun. 22, 2018, U.S. Appl. No. 32/688,923.

Westmoreland, Andrew B., et al., "Method, Apparatus, and System for Receiving and Storing Non-Schema Data Entries in Spatial Instances of Heterogeneous Databases" filed Aug. 1, 2018, U.S. Appl. No. 62/713,446.

Westmoreland, Andrew B., et al., "Method, Apparatus, and System for Receiving and Weighting Non-Schema Data Entries in Spatial Instances of Heterogeneous Databases" filed Aug. 10, 2018, U.S. Appl. No. 62/717,219.

Westmoreland, Andrew B., et al., "Method and System for Determining Transfer of Asynchronous Correlation of Data Entries in Spacial Instances of Heterogenous Databases" filed Dec. 3, 2018, U.S. Appl. No. 62/774,692.

Westmoreland, Andrew B., et al., "Method and System for Asynchronous Correlation of Data Entries in Spatially Separated Instances of Heterogenous Databases," filed Sep. 7, 2018, U.S. Appl. No. 16/124,889.

Westmoreland, Andrew B., et al.,"Method, Apparatus, and System for Receiving and Weighting Non-Schema Data Entries in Spatial Instances of Heterogeneous Databases," filed Aug. 9, 2019, U.S. Appl. No. 16/537,510.

Westmoreland, Andrew B., et al.,"Method Apparatus and System for Receiving and Weighting Nonschema Data Entries in Spatial Instances of Heterogeneous Databases," filed Aug. 1, 2019, U.S. Appl. No. 16/529,783.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,755.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,770.

Westmoreland, Andrew B., et al., "Method and System for Asynchronous Correlation of Data Entries in Spatially Separated Instances of Heterogenous Databases," filed Aug. 2, 2019, U.S. Appl. No. 16/529,788.

Office Action dated Mar. 4, 2022, U.S. Appl. No. 16/529,783, filed Aug. 1, 2019.

Notice of Allowance dated Mar. 25, 2022, U.S. Appl. No. 16/529,755, filed Aug. 1, 2019.

Netscape Support, "Persistent Client State HTTP Cookies", http://www.netscape.com/newsref/std/cookie_spec.html; Document obtained via Web.archive.org capture obtained Jan. 24, 2002 at time 18:05:35. (Year: 2002).

* cited by examiner

METHOD AND SYSTEM FOR DETERMINING TRANSFER OF ASYNCHRONOUS CORRELATION OF DATA ENTRIES IN SPATIAL INSTANCES OF HETEROGENEOUS DATABASES

CROSS-REFERENCE TO RELATED APPLICATION AND PRIORITY CLAIM

Not applicable.

TECHNICAL FIELD

The present disclosure relates to storing user data from web browsing sessions in a user profile and retrieving a specific subset of the stored user data.

BACKGROUND

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY

This disclosure provides systems and methods for transferring data pieces containing personal identification information (PII) provided during a web browser session.

In a first embodiment, the disclosure provides an apparatus including a computing system that is communicatively linked to one or more servers. The computing system includes at least one memory and at least one processor. The computing system is configured to receive a data piece from an electronic device. The data piece includes one or more items of anonymous personal identification information. The computing system is also configured to identify an electronic address associated with the data piece. The computing system is further configured to access the one or more servers to identify one or more client systems permitted to transmit data to the electronic device based on the electronic address. In addition, the computing system is configured to transmit the data piece to the one or more client systems permitted to transmit data to the electronic device.

In a second embodiment, the disclosure provides a method implemented by a computing system. The method includes receiving, by the computing system, a data piece from an electronic device. The data piece includes one or more items of anonymous personal identification information. The method also includes identifying, by the computing system, an electronic address associated with the data piece. The method further includes accessing, by the computing system, one or more servers to identify one or more client systems permitted to transmit data to the electronic device based on the electronic address. In addition, the method includes transmitting, by the computing system, the data piece to the one or more client systems permitted to transmit data to the electronic device.

In a third embodiment, the disclosure provides a non-transitory, computer-readable storage medium. The non-transitory, computer-readable storage medium stores one or more executable instructions that, when executed by at least one processor, causes the at least one processor to receive a data piece from an electronic device. The data piece comprises one or more items of anonymous personal identification information. The one or more executable instructions that, when executed by at least one processor, also causes the at least one processor to identify an electronic address associated with the data piece. The one or more executable instructions that, when executed by at least one processor, further causes the at least one processor to access the one or more servers to identify one or more client systems permitted to transmit data to the electronic device based on the electronic address. In addition, the non-transitory, computer-readable storage medium stores one or more executable instructions that, when executed by at least one processor, causes the at least one processor to transmit the data piece to the one or more client systems permitted to transmit data to the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrases "computer readable program code" and "executable instruction" includes any type of computer code, including source code, object code, and executable code. The phrase "computer readable medium" and "computer-readable storage medium" includes any type of medium capable of being accessed by a computer or a processor, such as read only memory (ROM), random access memory (RAM), a hard disk drive, a compact disc (CD), a digital video disc (DVD), or any other type of memory. A "non-transitory" computer-readable medium and a "non-transitory" computer-readable storage medium exclude wired, wireless, optical, or other communication links that transport transitory electrical or other signals. A non-transitory, computer-readable medium and a non-transitory, computer-readable storage medium include media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
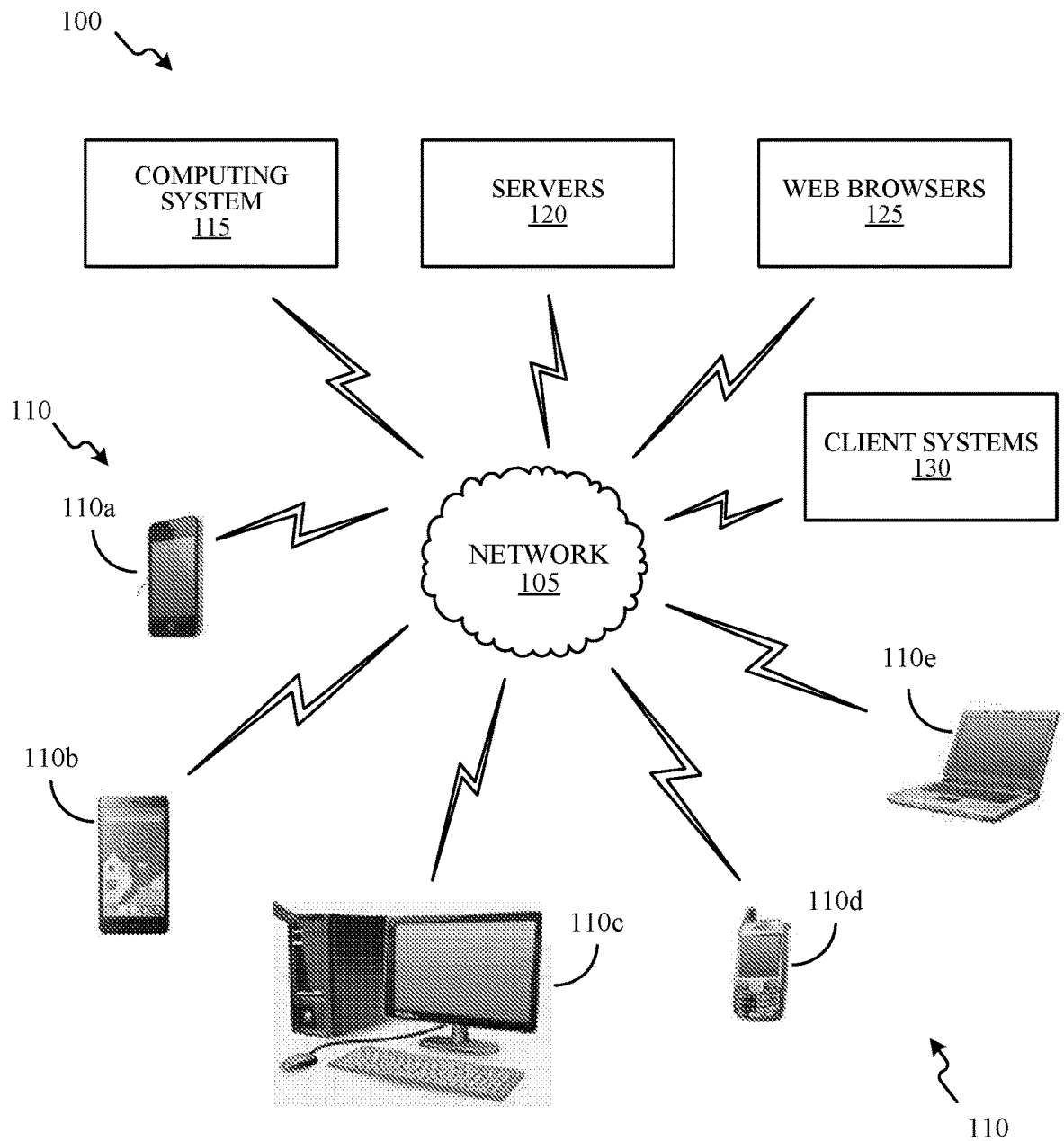
FIG. 1 illustrates a non-limiting, example network context 100 for operating a computing system 115 according to certain embodiments of this disclosure.

FIG. 1 illustrates a non-limiting, example network context 100 for operating a computing system 115 according to certain embodiments of this disclosure. One or more components of the network context 100 may operate as separate components linked by one or more constituent networks of the network 105. In some embodiments, one or more constituent networks of the network 105 may include the internet, which can be accessed over both wired connections (e.g., an Ethernet connection) or over a wireless connection (e.g., a wireless local area network "WLAN" connection or a cellular network connection). Additionally, or alternatively, one or more constituent networks of the network 105 may include a combination of private networks (e.g., a local wireless mesh network) and public networks (e.g., a telephone (POTS) network). In certain embodiments, one or more constituent networks of the network 105 may support multiple communication protocols, including both wireless protocols (e.g., BLUETOOTH™, circuit-switched cellular, 3G, LTE, WiBro) and internet protocols (e.g., HTTP).

The one or more constituent networks of the network 105 provide two-way connectivity between each of the electronic devices 110, the computing system 115, the one or more servers 120, the one or more web browsers 125, and the one or more client systems 130. In certain embodiments, the one or more constituent networks of the network 105 provide two-way connectivity between each of the electronic device 110, the computing system 115, the one or more servers 120, the one or more web browsers 125, and the one or more client systems 130 using one or more same or different channels, protocols, or networks of network 105. For example, a circuit-switched cellular protocol wireless network of the network 105 provides connectivity between the iPhone™ 110a and one or more of the web browsers 125 while a POTS wireless network of the network 105 provides connectivity between the smartphone 110c and at least one of the one or more web browsers 125.

In certain embodiments, the network context 100 includes one or more electronic devices 110. The one or more electronic devices 110 may include an iPhone™ 110a, a tablet 110b, a desktop computer 110c, a smartphone 110d, a laptop computer 110e, or the like. In certain embodiments, each of the one or more electronic devices 110 is configured to initiate a web browser session with a web browser 125 or access and display the one or more web browsers 125 through the network 105 for viewing by a user and for interaction between the user and the one or more web browsers 125. Additionally, or alternatively, each of the one or more electronic devices 110 is configured to transmit one or more items of anonymous personal identification information to a web browser 125 during a web browser session.

In certain embodiments, each of the one or more electronic devices 110 may be configured to store data pieces received from a web browser 125 during a web browser session. Each data piece may contain at least one of an electronic address or one or more items of anonymous personal identification information that were transmit by the electronic device 110 to the web browser 125 during the web browser session. The electronic address may provide an anonymous indication of an electronic communication reception or transmission location of the electronic device 110 so that one or more other electronic devices 110, one or more servers 120, one or more web browsers 125, or one or more client systems 130 may electronically communicate with that electronic device 110. For example, an electronic address may include at least one of a MAC address, an IMEI number, an electronic device serial number, an email address, a pointer associated with a data port of the electronic device, or the like. An item of anonymous personal identification information may include information associated with a user of an electronic device and identifies characteristics, preferences, interests, or associations of the user of the electronic device. For example, an item of anonymous personal identification information may include at least one of an email address, a postal address, a user ID, a gender, an age group, a user interest, or the like. In certain embodiments, the electronic device 110 includes an electronic device display screen, an electronic device memory, and at least one electronic device processor. The electronic device may be configured to access and display content from one or more web browsers 125 on the electronic device display screen.

In certain embodiments, the network context 100 includes one or more web browsers 125. As described herein, the one or more web browsers 125 are configured to contain display content for viewing by an electronic device 110 when the electronic device 110 is engaged in a web browser session with the web browser 125. In certain embodiments, the one or more web browsers are configured to transmit data pieces to the electronic device 110 for storage in a memory of the electronic device 110 when the electronic device 110 is engaged in a web browser session with the web browser 125. The one or more web browsers 125 may also be configured to receive items of anonymous personal identification information transmitted from an electronic device 110 when the electronic device 110 is engage in a web browser session with the one or more web browsers 125. The electronic device 110 may store the items of the anonymous personal identification information transmitted to the web browser as well as an electronic device address associated with the electronic device 110 in a data piece received from the web browser 125 located in the memory of the electronic device 110.

Additionally, or alternatively, the network context 110 may include one or more client systems 130. A client system 130 may be a system operated by an independent entity (e.g., separate from the computing system 115 and the one or more servers 120) that receives, from the computing system 115, one or more items of anonymous personal identification information and at least one electronic address associated with the one or more items of anonymous personal identification information. For example, the client system 130 may receive, from the computing system 115, a first set of one or more items of anonymous personal identification information coupled with a first electronic address that is associated with the first electronic device 110a and a second set of one or more items of anonymous personal identification information coupled with a second electronic address that is associated with the second electronic device 110b.

In certain embodiments, the client system 130 may receive, from the computing system 115, a first data piece containing at least the first set of one or more items of anonymous personal identification information. Additionally, or alternatively, the first data piece may contain the first electronic address that is associated with the first electronic device 110a. Similarly, the client system 130 may receive, from the computing system 115, a second data piece containing at least the second set of one or more items of anonymous personal identification information. Additionally, or alternatively, the second data piece may contain the second electronic address that is associated with the second electronic device 110b. Subsequently, for example when the first data piece includes the first electronic address, the client system 130 may provide content to the first electronic device 110a using the first electronic address and based on the first set of one or more items of anonymous personal identification information. The client system 130 may also provide, for example when the second data piece includes the second electronic address, content to the second electronic device 110b using the second electronic address and based on the second set of one or more items of anonymous personal identification information.

In some embodiments, each client system 130 of the one or more client systems 130 may not be contractually prohibited from transmitting or may be contractually permitted to transmit content to every electronic device 110 of the one or more electronic devices 110. For example, each client system 130 of the one or more client systems 130 may not be contractually prohibited from receiving or may be contractually permitted to receive (e.g., a data piece containing) an electronic address and one or more items of anonymous personal identification information from every profile within the possession of the computing system 115 (e.g., stored in the one or more servers 120) and may subsequently transmit content to each of those electronic addresses based on the respective received one or more items of anonymous personal identification information.

In certain embodiments, at least one client system 130 of the one or more client systems 130 may be contractually prohibited from transmitting or may not be contractually permitted to transmit content to at least one electronic device 110 of the one or more electronic devices 110. For example, a first client system 130 of the one or more client systems 130 may not be contractually prohibited from transmitting or may be contractually permitted to transmit content to the first electronic device 110a or to a first electronic address associated with the first electronic device 110a but may be contractually prohibited from transmitting or may not be contractually permitted to transmit content to the second electronic device 110b or to a second electronic address associated with the second electronic device 110b. The first client system 130 may receive the first electronic address and one or more items of anonymous personal identification information from a first user profile associated with the first electronic device 110a but may not receive the second electronic address and one or more items of anonymous personal identification information from a second user profile associated with the second electronic device 110b.

Accordingly, the first client system 130 may transmit content to the first electronic device 110a using the received first electronic address from the first user profile. The transmitted content may be based on the one or more items of anonymous personal identification information from the first user profile. In addition, the first client system 130 may not transmit content to the second electronic device 110b because the client system 130 does not receive the second electronic address that is associated with the second electronic device 110b and because the first client system 130 does not receive one or more items of anonymous personal identification information from the second user profile.

As another example, a second client system 130 of the one or more client systems 130 may not be contractually prohibited from transmitting or may be contractually permitted to transmit content to the second electronic device 110b or to the second electronic address associated with the second electronic device 110b but may be contractually prohibited from transmitting or may not be contractually permitted to transmit content to the first electronic device 110a or to the first electronic address associated with the first electronic device 110a. The second client system 130 may receive the second electronic address and one or more items of anonymous personal identification information from the second user profile associated with the second electronic device 110b but may not receive the first electronic device address and one or more items of anonymous personal identification information from the first user profile associated with the first electronic device 110a.

Accordingly, the second client system 130 may transmit content to the second electronic device 110b using the received second electronic address from the second user profile. The transmitted content may be based on the one or more items of anonymous personal identification information from the second user profile. In addition, the second client system 130 may not transmit content to the first electronic device 110a because the second client system 130 does not receive the first electronic address that is associated with the first electronic device 110a and because the second client system 130 does not receive one or more items of anonymous personal identification information from the first user profile.

In certain embodiments, each of the one or more client systems 130 may not be contractually prohibited from receiving or may be contractually permitted to receive an electronic address and one or more items of anonymous personal identification information from one or more electronic devices based on which domains the computing system 130 received the electronic address and the one or more items of anonymous personal identification information through. For example, an electronic device 110 may provide an electronic permission to a first domain to store an electronic address of the electronic device 110 and one or more items anonymous personal identification information in a data piece associated with the first domain and stored in the memory of the electronic device 110 for subsequent access by the first domain. The computing system 115 may also be linked or associated with the first domain and may access the electronic address and the one or more items of anonymous personal identification information stored in the data piece on the electronic device 110 from the first domain. The computing system 110 may determine that a first client system 130 is not contractually prohibited from receiving or is contractually permitted to receive electronic addresses and items of anonymous personal identification information stored in a data piece on an electronic device 110 from the first domain. Thus, upon receiving an electronic address and one or more items of anonymous personal identification information stored in a data piece on an electronic device 110 from the first domain, the computing system 110 may not be contractually prohibited from transmitting or may be contractually permitted to transmit the electronic address and the one or more items of anonymous personal identification information stored in the data piece on the electronic device 110 from the first domain to the first client system 130.

In certain embodiments, at least one client system 130 of the one or more client systems 130 may be contractually prohibited from receiving or may not be contractually permitted to receive an electronic address and one or more items of anonymous personal identification information from one or more electronic devices 110 that received the electronic address and the one or more items of anonymous personal identification information through at least one domain. For example, an electronic device 110 may have provided an electronic permission to a second domain to store an electronic address of the electronic device 110 and one or more items anonymous personal identification information in a data piece associated with the second domain and stored in the memory of the electronic device 110 for subsequent access by the second domain. The computing system 115 may also be linked or associated with the second domain and may access the electronic address and the one or more items of anonymous personal identification information stored in the data piece on the electronic device 110 from the second domain. The computing system 110 may, however, determine that the first client system 130 is contractually prohibited from receiving or is not contractually permitted to receive electronic addresses and items of anonymous personal identification information stored in a data piece on the electronic device 110 from the second domain. Thus, upon receiving an electronic address and one or more items of anonymous personal identification information stored in a data piece on an electronic device 110 from the second domain, the computing system 110 may be contractually prohibited from transmitting or may not be contractually permitted to transmit the electronic address and the one or more items of anonymous personal identification cation information stored in the data piece on the electronic device 110 from the second domain to the first client system 130.

In some embodiments, the network context 100 may include one or more servers 120. In certain embodiments, the one or more servers 120 stores user profiles that each include at least one electronic address and one or more items of anonymous personal identification information. As described herein, the computing system 115 may store at least one electronic address and one or more items of anonymous personal identification information that are associated with the at least one electronic device address in individual user profiles stored in the one or more servers 120.

In certain embodiments, the one or more servers 120 may also contain a list of each of the one or more client systems 130 and one or more contractual permissions or contractual prohibitions for each of the one or more client system 130 with one or more other client systems 130. For example, the one or more servers 120 may include a list of a plurality of client systems 130 including a first client system, a second client system, and a third client system. In the list of the plurality of client systems 130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 110. Conversely, in the list of the plurality of client systems 130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 110.

In certain embodiments, the one or more servers 120 may also contain a list of each of the one or more client systems 130 and one or more contractual permissions or contractual prohibitions for each of the one or more client system 130 with one or more domains. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from data pieces stored on an electronic device 110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 110.

Conversely, in the list of the plurality of client systems 130, the first client system may have contractual permission to receive or may not have contractual prohibition from receiving electronic addresses and items of anonymous personal identification information from data pieces stored on an electronic device 110 from a second domain. However, the second client system may not have contractual permission to receive or may have contractual prohibition from receiving electronic addresses and items of anonymous personal identification information from data pieces stored on an electronic device 110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 110 while the second client system may not be contractually permitted to use or may be contractually prohibited from using the received electronic addresses and items of anonymous personal identification information from the second domain or contained in data pieces from the second domain to transmit content to electronic devices 110.

In certain embodiments, the one or more servers 120 may also contain a list of each of the one or more client systems 130 that indicates one or more electronic device 110 that have given electronic permission to receive content from that client system 130. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from a first electronic device 110. Accordingly, both the first client system and the second client system may each be contractually permitted to use or may each not be contractually prohibited from using the received electronic addresses and items of anonymous personal identification information from the first electronic device to transmit content to electronic devices 110 (e.g., the first electronic device). Conversely, in the list of the plurality of client systems 130, the first client system may have contractual permission to receive or may not have contractual prohibition from receiving electronic addresses and items of anonymous personal identification information from a second electronic device 110. However, the second client system may not have contractual permission to receive or may have contractual prohibition from receiving electronic addresses and items of anonymous personal identification information from the second electronic device 110. Accordingly, the first client system may be contractually permitted to use or may not be contractually prohibited from using the received electronic addresses and items of anonymous personal identification information from the second electronic device 110 to transmit content to electronic devices 110 while the second client system may not be contractually permitted to use or may be contractually prohibited from using the received electronic addresses and items of anonymous personal identification information from the second electronic device 110 to transmit content to electronic devices 110.

Figure 2:
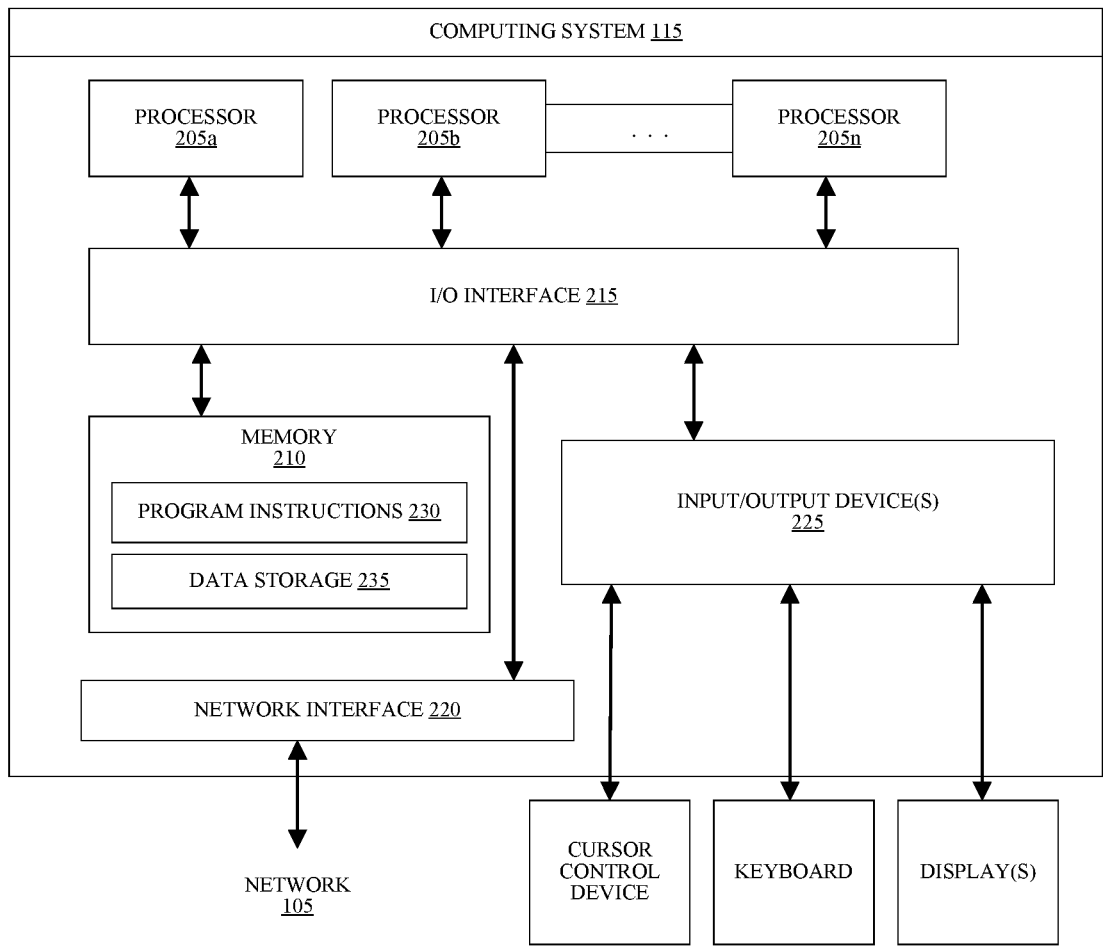
FIG. 2 illustrates a non-limiting, example computing system configured to perform data piece transfer operations according to certain embodiments of the disclosure.

In certain embodiments, the network context 100 includes one or more computing systems 115. FIG. 2 illustrates a non-limiting, example of the computing system 115 illustrated in FIG. 1. The computing system 115 is configured to execute any and all of the embodiments and operations described herein including embodiments for performing data piece transfer operations. In certain embodiments, the computing system 115 may perform data piece transfer operations for transferring data pieces containing anonymous personal identification information provided during a web browser session. In different embodiments, the computing system 115 may be any of various types of devices, including, but not limited to, a computer embedded in an appliance, a personal computer system, a desktop computer, a handset, a laptop computer, a notebook computer, a tablet, a slate, a netbook computer, a handheld computer, a consumer device, a portable storage device, a mainframe computer system, a workstation, network computer, a mobile device, an application server, a storage device, a peripheral device such as a switch, modem, router, or in general any type of electronic computing device.

Various embodiments of a system and method for performing data piece transfer operations, as described herein, may be executed on one or more computing systems 115, which may interact with various other devices. In the illustrated embodiment, the computing system 115 includes one or more processors 205a, 205b, . . . , and 205n (hereinafter "one or more processors 205," "processor 205," or "processors 205") coupled to a memory 210 via an input/output (I/O) interface 215. The computing system 115 further includes a network interface 220 coupled to I/O interface 215, and one or more input/output devices 225, such as cursor control device, keyboard, and display(s). In some cases, it is contemplated that embodiments may be implemented using a single instance of the computing system 115, while in other embodiments multiple such systems, or multiple nodes making up the computing system 115, may be configured to host different portions or instances of embodiments. For example, in one embodiment, some elements may be implemented via one or more nodes of the computing system 115 that are distinct from those nodes implementing other elements.

In various embodiments, the computing system 115 may be a uniprocessor system including one processor 205a, or a multiprocessor system including several processors 205a-205n (e.g., two, four, eight, or another suitable number). The processor 205 may be any suitable processor capable of executing instructions or operations including data piece transfer operations as described herein. For example, in various embodiments the processor 205 may be general-purpose or embedded processors implementing any of a variety of instruction set architectures (ISAs), such as the x86, PowerPC, SPARC, or MIPS ISAs, or any other suitable ISA. In multiprocessor systems, each of processors 205 may commonly, but not necessarily, implement the same ISA.

The memory 210 may be configured to store the executable instructions or program instructions 230 for data piece transfer operations in the data storage 235 accessible by the processor 205. In various embodiments, the memory 210 may be implemented using any suitable memory technology, such as static random access memory (SRAM), synchronous dynamic RAM (SDRAM), nonvolatile/Flash-type memory, or any other type of memory. In the illustrated embodiment, the program instructions 230 may be configured to implement a system for transferring data pieces incorporating any of the functionality, as described herein. In some embodiments, program instructions 230 or data may be received, sent, or stored upon different types of computer-accessible media or on similar media separate from the memory 210 or the computing system 115. The computing system 115 is described as implementing at least some of the functionality of functional blocks in the figures described herein.

In certain embodiments, the data storage 235 of the memory 210 stores a plurality of domains associated with one or more web browsers 125. For example, the data storage 235 of the memory 210 stores one or more matrices that each contain a plurality of domains that are associated with one or more web browsers 125. Each of the matrices may have a plurality of rows and a plurality of columns forming a plurality of fields each containing a domain. Each of the plurality of rows may be assigned an order that the at least one processor 205 uses for directing an electronic device 110 to transmit anonymous personal identification information to domains and for domains to transmit data pieces containing the transmitted anonymous personal identification information for storage in a memory of the electronic device 110, as described herein.

It should be understood that each of the matrices can include a plurality of columns (e.g., hundreds of columns, thousands of columns, millions of columns) and a plurality of rows (e.g., hundreds of rows, thousands of rows, millions of rows) and thus, a plurality of domains (e.g., hundreds of domains, thousands of domains, millions of domains) may be stored in each of the matrices. In addition, the data storage 235 of the memory 210 may store a plurality of matrices (e.g., hundreds of matrices, thousands of matrices, millions of matrices) each of which is associated with a different web browser 125. Additionally, or alternatively, the data storage 235 of the memory 210 may store one or more matrices that are each associated with two or more different web browsers 125. A matrix provides the at least one processor 205 with a road map having alternative pathways through the domain orders for directing an electronic device 110 to communicate items of anonymous personal identification information to domains in each of the domain orders. The electronic device 110 may then receive and store data pieces from those domains on the electronic device 110 when the electronic device 110 is engaged in browser sessions on web browsers 125. The data pieces stored on the electronic device 110 may contain the transmitted items of personal identification information and an electronic address. The data pieces can subsequently be retrieved by the at least one processor 205 so that the at least one processor 205 may store electronic addresses and items of anonymous personal identification information from the retrieved data pieces in user profiles in one or more servers 120.

In certain embodiments, the I/O interface 215 may be configured to coordinate I/O traffic between the processor 205, the memory 210, and any peripheral devices in the computing system 115, including the network interface 220 or other peripheral interfaces, such as the input/output devices 225. In some embodiments, the I/O interface 215 may perform any necessary protocol, timing or other data transformations to convert data signals from one component (e.g., the memory 210) into a format suitable for use by another component (e.g., the processor 205). In some embodiments, the I/O interface 215 may include support for devices attached through various types of peripheral buses, such as a variant of the Peripheral Component Interconnect (PCI) bus standard or the Universal Serial Bus (USB) standard, for example. In some embodiments, the function of the I/O interface 215 may be split into two or more separate components, such as a north bridge and a south bridge, for example. Also, in some embodiments some or all of the functionality of the I/O interface 215, such as an interface to the memory 210, may be incorporated directly into the processor 205.

The network interface 220 may be configured to allow data to be exchanged between the computing system 115 and other devices attached to the network 105 (e.g., one or more electronic devices 110, one or more servers 120, one or more web browsers 125, one or more client systems 130) or between nodes of the computing system 115. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 220 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network or protocol.

The input/output devices 225 may, in some embodiments, include one or more display terminals, keyboards, keypads, touchpads, scanning devices, voice, or optical recognition devices, or any other devices suitable for entering or accessing data by one or more the computing system 115. Further, various other sensors may be included in the I/O devices 225, such as imaging sensors, barometers, altimeters, LIDAR, or any suitable environmental sensor. Multiple input/output devices 225 may be present in the computing system 115 or may be distributed on various nodes of the computing system 115. In some embodiments, similar input/output devices may be separate from the computing system 115 and may interact with one or more nodes of the computing system 115 through a wired or wireless connection, such as over the network interface 220.

As shown in FIG. 2, the memory 210 may include program instructions 230, which may be processor-executable to implement any element, action, or operation including data piece transfer operations, as described herein. In certain embodiment, the program instructions may implement at least a portion of methods described herein, such as the methods illustrated by FIGS. 3-6. In other embodiments, different elements and data may be included. Note that the data storage 235 may include any data or information, as described herein.

Those skilled in the art will appreciate that the computing system 115 is merely illustrative and is not intended to limit the scope of embodiments. In particular, the computing system and devices may include any combination of hardware or software that can perform the indicated functions, including computers, network devices, Internet appliances, PDAs, wireless phones, pagers, GPUs, specialized computer systems, information handling apparatuses, or the like. The computing system 115 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system 115 via inter-computer communication. Some or all of the system components or data structures may also be stored (e.g., as instructions or structured data) on a computer-accessible medium or a portable article to be read by an appropriate drive, various examples of which are described here. In some embodiments, instructions stored on a computer-accessible medium separate from the computing system 115 may be transmitted to the computing system 115 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

As described herein, the computing system 115, utilizing the at least one processor 205, is configured to perform one or more data piece transfer operations. In certain embodiments, the computing system 115, utilizing one or more processors 205 determines that an electronic device 110 has initiated an engagement in a web browser session with the web browser 125 or that an electronic device 110 has requested content from the web browser 125. For example, the electronic device 110 may be used to initiate a web browser session with a web browser 125 and display content from the web browser 125 on a display screen. The computing system 115 utilizing the one or more processors 125 may be configured to detect or determine that the electronic device 110 has initiated an engagement into a web browser session with a web browser 125, that the electronic device 110 is engaged in a web browser session with a web browser 125, or that an electronic device 110 has requested content from the web browser 125 while the electronic device 110 is engaged in a web browser session with the web browser 125. Upon engaging in the web browser session with the web browser 125, the electronic device 110 receives a data piece associated with the web browser 125 and stores the data piece in a memory of electronic device 110. The data piece received from the web browser 125 and stored in the memory of electronic device 110 includes an electronic address that is unique to the electronic device 110. As described herein, an electronic address may include at least one of a MAC address, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email address, a postal address, a user ID, a gender, an age group, a user interest, or the like. In certain embodiments, each of the one or more items of anonymous personal identification information may include a hash value.

Subsequently, the computing system 115 accesses one or more matrices stored in the data storage 235 of the memory 210. At least one matrix of the one or more matrices may be associated with one or more types of data piece blocking software that may be stored on the electronic device 110. Additionally, or alternatively, at least one matrix of the one or more matrices may be associated with the web browser 125 that the electronic device 110 is engaged with. The computing system 115 may identify a plurality of domains from a matrix that are associated with the web browser 125 and determine which of those domains can transmit data pieces to the electronic device 110 that are retrievable by the computing system 115 during or after the web browser session between the electronic device 110 and the web browser 125.

In certain embodiments, the one or more electronic devices 110 may store and execute data piece blocking software (e.g., anti-identification software, pop-up blocker software, advertisement (ad) blocker software). The data piece blocking software may flag or block specific strings of HTML code contained in certain data pieces or may flag or block data pieces associated with entire domains. The data piece blocking software may flag or block a data piece due to a specific string of HTML code contained in the data piece. Additionally, or alternatively, the data piece blocking software may block access to all data pieces from particular domains which are residing in the electronic device memory. In certain embodiments, the data piece blocking software may not flag or block particular data pieces due to a lack of a specific string of HTML code contained in the particular data pieces that would cause the data piece blocking software to block the particular data pieces. Additionally, or alternatively, the data piece blocking software may not block access to data pieces from particular domains which are residing in the electronic device memory.

When the computing system 115 accesses the one or more matrices stored in the data storage 235 of the memory 210, the computing system 115 or the web browser 125 generates a data piece to be transmitted by the web browser 125. The data piece is configured for storage in the memory of the electronic device 110 and includes an electronic address and one or more items of anonymous personal identification information transmitted by the electronic device 110 to the web browser 125. Subsequently, the computing system 115 may retrieve or receive the electronic address and the one or more items of anonymous personal identification information contained in the data piece stored in the memory of the electronic device 110.

In certain embodiments, the computing system 115, utilizing one or more processors 205 directs a transmission of a data piece to an electronic device 110, when the electronic device 110 is engaged in a web browser session on a web browser 125, for storage in an electronic device memory. The data piece may be associated with a domain that is linked to or associated with the web browser 125. In certain embodiments, a data piece may contain a first instruction to the electronic device 110. The first instruction may identify one or more domains in a first domain order identified in the matrix and instruct the electronic device 110 to initiate communication with those one or more domains. For example, after receiving the first instruction, the electronic device 110 may initiate communication with or transmit one or more items of anonymous personal identification information to a first domain of the one or more domains in first domain order indicated in the first instruction. After initiating communication with or transmitting the one or more items of anonymous personal identification information to the first domain of the one or more domains from the first domain order, the data piece blocking software executed by the electronic device 110 may block the reception of a data piece from the first domain of the one or more domains in the first domain order identified in the first instruction.

While the electronic device 110 initiates communication with or transmits one or more items of anonymous personal identification information to the first domain of the first domain order or during or after (e.g., in response to) the data piece blocking software on the electronic device 110 blocks the data piece from the first domain of the first domain order, the first instruction may instruct the electronic device 110 to initiate communication with or transmit one or more items of anonymous personal identification information to a second domain of the one or more domains in the first domain order indicated in the first instruction. After initiating communication with or transmitting the one or more items of anonymous personal identification information to the second domain of the one or more domains from the first domain order, a data piece (e.g., generated by the computing system 115, generated by the second domain) may be transmitted to the electronic device 110 from the second domain and stored in a memory of the electronic device 110. Subsequently, the computing system 115 may attempt to retrieve (e.g., through the second domain) an electronic address and one or more item of anonymous personal identification information contained in the data piece from the second domain. During or after the computing system 115 attempts to retrieve the electronic address and the one or more item of anonymous personal identification information stored in the data piece from the second domain, the data piece blocking software may block the retrieval of the electronic address and the one or more item of anonymous personal identification information stored in the data piece from the second domain.

While the electronic device 110 initiates communication with or transmits one or more items of anonymous personal identification information to the second domain of the first domain order or during or after (e.g., in response to) the data piece blocking software on the electronic device 110 blocks access to the data piece from the second domain of the first domain order, the first instruction may instruct the electronic device 110 to initiate communication with or transmit one or more items of anonymous personal identification information to a third domain of the one or more domains in the first domain order indicated in the first instruction. After initiating communication with or transmitting the one or more items of anonymous personal identification information to the third domain of the one or more domains from the first domain order, a data piece (e.g., generated by the computing system 115, generated by the third domain) may be transmitted to the electronic device 110 from the third domain and stored in a memory of the electronic device 110. Subsequently, the computing system 115 may successfully retrieve (e.g., through the third domain) an electronic address and one or more item of anonymous personal identification information stored in the data piece from the third domain.

In certain embodiments, after the computing system 115 successfully receives the electronic address and the one or more item of anonymous personal identification information stored in the data piece from a domain from the first domain order, the first instruction may instruct the electronic device 110 to not transmit one or more item of anonymous personal identification information to another domain of the first domain order. In this case, a second instruction included in a data piece that was successfully received by computing system 115 from the electronic device 110 may instruct the electronic device 110 to initiate communication with or transmit one or more item of anonymous personal identification information to one or more domains in a second domain order indicated in the second instruction, described herein.

Alternatively, the first instruction may instruct the electronic device 110 to initiate communication with or transmit one or more item of anonymous personal identification information to all of the domains of the first domain order indicated by the first instruction before initiating instructions contained in a data piece from a domain of the first domain order. For example, while the electronic device 110 communicates with or transmits one or more item of anonymous personal identification information to the third domain of the first domain order or during or after (e.g., in response to) the computing system 115 receives a data piece from the third domain of the first domain order, the first instruction may instruct the electronic device 110 to initiate communication with or transmit one or more items of anonymous personal identification information to a fourth domain of the one or more domains in the first domain order indicated in the first instruction. After initiating communication with or transmitting the one or more items of anonymous personal identification information to the fourth domain of the one or more domains from the first domain order, a data piece (e.g., generated by the computing system 115, generated by the fourth domain) may be transmitted to the electronic device 110 from the fourth domain and stored in a memory of the electronic device 110. Subsequently, the computing system 115 may successfully retrieve (e.g., through the fourth domain) an electronic address and one or more item of anonymous personal identification information stored in the data piece from the fourth domain.

The first instruction may cause the electronic device 110 to initiate communication with or transmit one or more items of anonymous personal identification information to each domain of the one or more domains from the first domain order identified in the first instruction. Thus, the computing system 115 may be able to retrieve, from an electronic device 110, an electronic address and one or more items of anonymous personal identification information stored in data pieces from one or more domains of the first domain order that are not blocked from storing data pieces in the memory of the electronic device 110 by data piece blocking software. Additionally, or alternatively, the computing system 115 may be able to retrieve, from an electronic device 110, an electronic address and one or more items of anonymous personal identification information stored in data pieces from one or more domains of the first domain order that are not blocked by data piece blocking software from being access from the memory of the electronic device 110. In certain embodiments, upon receiving an electronic address and one or more items of anonymous personal identification information from at least one domain of the one or more domains from the first domain order identified by the first instruction, the computing system 115 may determine which domains provided data pieces that are blocked and that are not blocked by data piece blocking software on the electronic device 110. The computing system 115 may designate a matrix for the data piece blocking software or the electronic device 115 and indicate (e.g., record a notation in the matrix) which domains are blocked and not blocked by the electronic device 110 or the data piece blocking software executed on the electronic device 110.

In certain embodiments, a data piece transmitted to an electronic device 110 through a domain of the one or more domains in the first order domain and stored in a memory of the electronic device 110 may contain a second instruction. The second instruction may identify one or more domains in a second order domain and instruct the electronic device 110 to initiate communication with those one or more domains. For example, a data piece from a domain of the first order domain may not have been blocked by data piece blocking software and thus may be stored in a memory of an electric device 110. In certain embodiments, access to the data piece, after the data piece is stored in the memory of the electronic device 110, may not be blocked by data piece blocking software and thus may be accessible by a processor of the electronic device 110 or the computing system 115. The data piece from the domain of the first domain order may contain a second instruction.

After receiving the second instruction, the electronic device 110 may process the second instruction and initiate communication with or transmit one or more items of anonymous personal identification information to a first domain of one or more domains in the second domain order indicated in the second instruction. After initiating communication with or transmitting the one or more items of anonymous personal identification information to the first domain of the one or more domains from the second domain order, the data piece blocking software executed by the electronic device 110 may block the reception of a data piece from the first domain of the second domain order identified in the second instruction.

While the electronic device 110 communicates with or transmits one or more items of anonymous personal identification information to the first domain of the second domain order or during or after (e.g., in response to) the data piece blocking software on the electronic device 110 blocks the data piece from the first domain of the second domain order, the second instruction may instruct the electronic device 110 to initiate communication with or transmit one or more items of anonymous personal identification information to a second domain of the one or more domains in the second domain order indicated in the second instruction. After initiating communication with or transmitting the one or more items of anonymous personal identification information to the second domain of the one or more domains from the second domain order, a data piece (e.g., generated by the computing system 115, generated by the second domain) may be transmitted to the electronic device 110 from the second domain and stored in a memory of the electronic device 110. Subsequently, the computing system 115 may attempt to retrieve (e.g., through the second domain) an electronic address and one or more item of anonymous personal identification information contained in the data piece from the second domain. During or after the computing system 115 attempts to retrieve the electronic address and the one or more item of anonymous personal identification information stored in the data piece from the second domain, the data piece blocking software may block the retrieval of the electronic address and the one or more item of anonymous personal identification information stored in the data piece from the second domain.

While the electronic device 110 communicates with or transmits one or more items of anonymous personal identification information to the second domain of the second domain order or during or after (e.g., in response to) the data piece blocking software on the electronic device 110 blocks access to the data piece from the second domain of the second domain order, the second instruction may instruct the electronic device 110 to initiate communication with or transmit one or more items of anonymous personal identification information to a third domain of the one or more domains in the second domain order indicated in the second instruction. After initiating communication with or transmitting the one or more items of anonymous personal identification information to the third domain of the one or more domains from the second domain order, a data piece (e.g., generated by the computing system 115, generated by the third domain) may be transmitted to the electronic device 110 from the third domain and stored in a memory of the electronic device 110. Subsequently, the computing system 115 may successfully retrieve (e.g., through the third domain) an electronic address and one or more item of anonymous personal identification information stored in the data piece from the third domain.

In certain embodiments, after the computing system 115 successfully receives the electronic address and the one or more item of anonymous personal identification information stored in the data piece from a domain from the second domain order, the second instruction may instruct the electronic device 110 to not initiate communication with or not transmit one or more item of anonymous personal identification information to another domain of the second domain order. In this case, a third instruction included in a data piece that was successfully received by computing system 115 may instruct the electronic device to initiate communication with or transmit one or more item of anonymous personal identification information to one or more domains in a third domain order indicated in the third instruction.

Alternatively, the second instruction may instruct the electronic device 110 to initiate communication with or transmit one or more item of anonymous personal identification information to all of the domains of the second domain order indicated by the second instruction before initiating the instructions contained in a data piece from a domain of the second domain order. For example, while the electronic device 110 communicates with or transmits one or more items of anonymous personal identification information to the third domain of the second domain order or during or after (e.g., in response to) the computing system 115 receives the data piece from the third domain of the second domain order, the second instruction may instruct the electronic device 110 to initiate communication with or transmit one or more items of anonymous personal identification information to a fourth domain of the one or more domains in the second domain order indicated in the second instruction. After initiating communication with or transmitting the one or more items of anonymous personal identification information to the fourth domain of the one or more domains from the second domain order, a data piece (e.g., generated by the computing system 115, generated by the fourth domain) may be transmitted to the electronic device 110 from the fourth domain and stored in a memory of the electronic device 110. Subsequently, the computing system 115 may successfully retrieve (e.g., through the fourth domain) the electronic address and the one or more item of anonymous personal identification information stored in the data piece from the fourth domain.

As described herein, the second instruction may cause the electronic device 110 to initiate communication with or transmit one or more items of anonymous personal identification information to each domain of the one or more domains from the second domain order identified in the second instruction. Thus, the computing system 115 may be able to retrieve, from an electronic device 110, an electronic address and one or more items of anonymous personal identification information stored in data pieces from one or more domains of the second domain order that are not blocked from storing data pieces in the memory of the electronic device 110 by data piece blocking software. Additionally, or alternatively, the computing system 115 may be able to retrieve, from an electronic device 110, an electronic address and one or more items of anonymous personal identification information stored in data pieces from one or more domains of the second domain order that are not blocked by data piece blocking software from being access from the memory of the electronic device 110.

In certain embodiments, upon receiving an electronic address and one or more items of anonymous personal identification information from at least one domain of the one or more domains from the second domain order identified by the first instruction, the computing system 115 may determine which domains provided data pieces that are blocked and that are not blocked by data piece blocking software on the electronic device 110. The computing system 115 may use the designated matrix for the data piece blocking software or the electronic device 115 and indicate (e.g., record a notation in the matrix) which domains are blocked and not blocked by the electronic device 110 or the data piece blocking software executed on the electronic device 110. The electronic device 110 may receive data pieces from a plurality of domains in a plurality of domain orders from a third domain order, to a fourth domain order, to an Nth domain order.

The computing system 115, utilizing one or more processors 205, is configured to receive a data piece containing one or more items of anonymous personal identification information from an electronic device 110. In certain embodiments, after the data pieces are transmitted to the electronic device 110 and stored in the memory of electronic device 110, the computing system 115 attempts to retrieve or receive each of the data pieces stored in the memory of electronic device 110 (e.g., through each of the domains). In certain embodiments, the computing system 115 attempts to retrieve or receive each of the data pieces stored in the memory electronic device 110 regardless of whether the electronic device 110 has transmitted one or more items of anonymous personal identification information to the web browser 125. For example, after the computing system 115 has transmitted each of the data pieces through the domains to the electronic device 110 for storage in the memory of electronic device 110, the computing system 115 initiates a retrieval test to determine which, if any, data pieces the computing system 110 is able to retrieve. The retrieval test may allow the computing system 115 to determine which data pieces are not retrievable from the memory of electronic device 110 due to data piece blocking software and what data pieces are retrievable from the memory of the device 110. The retrieval test may be performed by attempting to retrieve an electronic address contained in each of the data pieces. Thus, the computing system 115 may determine which data pieces can be retrieved from the memory of electronic device 110 and which data pieces cannot be retrieved from the memory of the electronic device 110 regardless of whether the electronic device 110 has transmitted one or more items of anonymous personal identification information to the web browser 125. Subsequently, the computing system 115 may seek to retrieve or receive from the memory of electronic device 110 only those data pieces determined to be retrievable by the retrieval test for storage of an electronic address and one or more items of anonymous personal identification information for storage in the server 120.

In certain embodiments, the computing system 115 attempts to retrieve each of the data pieces stored in the memory of electronic device 110 after the electronic device 110 has transmitted one or more items of anonymous personal identification information to the web browser 125 (e.g., through each of the domains). For example, after the computing system 115 has transmitted each of the data pieces to the electronic device 110 for storage in the memory of electronic device 110 and after the electronic device 110 has transmitted one or more items of anonymous personal identification information to the web browser 125 during the web browser session, the computing system 115 initiates data piece retrieval to retrieve the data pieces associated with the each of the domains from a matrix and stored in the memory of electronic device 110. In response to initiating the data piece retrieval, the computing system 115 retrieves only some of the data pieces previously stored in the memory of electronic device 110. Based on determining which data pieces have been retrieved and which data pieces have not been retrieved, the computing system 115 determines which, if any, data pieces the computing system 110 is able to retrieve. Subsequently, the computing system 115 may seek to retrieve from the memory of the electronic device 110 only those data pieces determined to be retrievable and containing subsequently transmitted electronic addresses and items of anonymous personal identification information for storage in the server 120.

After (e.g., in response to) determining which data pieces can be retrieved from the memory of the electronic device 110 and which data pieces cannot be retrieved from the memory of the electronic device 110, the computing system 115 marks each of the domains in the matrix that are associated with data pieces that cannot be retrieved and links each of the domains in the matrix into one or more chains of data pieces that can provide retrievable data pieces from the memory of electronic device 110 by the computing system 115.

In certain embodiments, domains that are linked to the web browser 125 and thus the computing system 115 may be domains that transmit data pieces containing instructions that direct an electronic device 110 to initiate communication with or transmit one or more items of anonymous personal identification information to a domain in an order domain. In certain embodiments, domains that are linked to the web browser 125 and thus the computing system 115 may be domains that provide data pieces that are retrievable by the computing system 115 when those data pieces are stored in a memory of the electronic device 110. In certain embodiments, domains and a web browser 125 that are linked to the computing system 115 may be domains and a web browser that each transmits data pieces generated by the computing system 115 including instructions as described herein.

In certain embodiments, the computing system 115, utilizing one or more processors 205 retrieves the data pieces determined to be retrievable by the computing system 115 from the memory of the electronic device 110. The data pieces retrieved by the computing system 115 include an electronic address and one or more items of anonymous personal identification information provided by the electronic device 110 during the web browser session with the web browser 115. Thus, upon receiving a data piece, the computing system 115 may identify an electronic address contained in the data piece and associate that electronic address with the received data piece.

In some embodiments, the electronic device 110 will not be storing data piece blocking software and thus all data pieces stored on the memory of the electronic device 110 by the computing system 115 are retrievable and thus retrieved by the computing system 115. In some embodiments, some data pieces generated by the computing system 115 and stored in the memory of electronic device 110 may not be retrievable by the computing system 115 from the memory of electronic device 110 due to data piece blocking software stored and executed on electronic device 110. In some embodiments, all data pieces generated by the computing system 115 and stored in the memory of the electronic device 110 may not be retrieval by the computing system 115 from the memory of electronic device 110 due to data piece blocking software stored in the memory of the electronic device 110.

In certain embodiments, the computing system 115, utilizing the at least one processor 205, stores the electronic address and the one or more items of anonymous personal identification information from the retrieved data pieces in user profiles on the one or more servers 120. In certain embodiments, the computing system 115 stores the electronic address and the one or more items of anonymous personal identification information from the retrieved data pieces in one or more user profile previously created and stored on the one or more servers 120.

For example, the computing system 115 may have previously generated one or more user profiles each containing at least one of an electronic address or one or more items of anonymous personal identification information provided in a previously obtained data piece. When the computing system 115 receives the retrieved data pieces each containing an electronic address and one or more items of anonymous personal identification information, the computing system 115 may match at least one of the electronic address or at least one of the one or more items of anonymous personal identification information from a retrieved data piece with at least one of the electronic address or at least one of the one or more items of anonymous personal identification information stored in a user profile. When the computing system 115 identifies a match, the computing system 115 may store the electronic address and the one or more items anonymous personal identification information from the retrieved data piece in the user profile in the servers 120. In certain embodiments, when the computing system 115 matches an item of anonymous personal identification information from a received data piece with an item of anonymous personal identification information stored in a user profile, the computing system 115 may associate an electronic address stored in the user profile with the received data piece.

In certain embodiments, the computing system 115, utilizing the at least one processor 205, stores electronic device identification and the one or more items of anonymous personal identity information from the received data pieces in newly created user profiles stored in the one or more servers 120. For example, the computing system 115 may search through the server 120 to identify (e.g., find, locate) user profiles containing at least one of an electronic address or one of one or more items of anonymous personal identification information that matches at least one of the electronic address or one of the one or more items of anonymous personal identification information contained in a retrieved data piece. After searching through the server 120, the computing system 115 may determine that no match exists between at least one of the electronic address or one of the one or more items of anonymous personal identification information contained in the retrieved data piece and at least one of an electronic address or one of one or more items of anonymous personal identification information contained in a user profile of the one or more servers 120. In response, the computing system 115 may create a new user profile in the server 120 and store the electronic address and the one or more items of anonymous personal identification information from the retrieved data piece in the newly created user profile.

In certain embodiments, the computing system 115, utilizing the at least one processor 205, stores an additional data piece in the user profile in the server 120 after the computing system 110 has stored retrieved data piece in the same user profile. For example, in response to matching at least one item of the one or more items of anonymous personal identification information from the retrieved data piece with one or more items of anonymous personal identification information from an additional data piece, the computing system 115 may store the additional data piece in the user profile in the server 120. The additional data piece may have been obtained from one or more other servers (e.g., not the one or more servers 120) or from another data piece retrieved from another electronic device 110.

In certain embodiments, the data pieces generated by the computing system 115 and retrieved from the electronic device 110 may include a cookie. A cookie (e.g., an HTTP cookie, a web cookie, an Internet cookie, a browser cookie) is a piece of data sent from a website and stored on a memory of an electronic device 110 by a web browser of the electronic device 110 while the electronic device is engaged in a browser session. In certain embodiments, the computing system 115, utilizing the at least one processor 205, maps or associates electronic addresses from a cookie to an open-source software footprint. An open-source software footprint may be a unique set of traceable digital activities, actions, contributions, or communications that are manifested in open-source code on the internet or on electronic devices. The electronic device 110 may transmit one or more items of anonymous personal identification information to the web browser 125 during a browser session. The one or more items of anonymous personal identification information transmitted from the electronic device 110 includes an open-source software footprint that is unique to the electronic device 110 or that provides the computing system 115 with an acceptable level of certainty that the specific electronic device 110 is transmitting the one or more items of anonymous personal identification information.

When the electronic device 110 transmits the one or more items of anonymous personal identification information to the web browser 125, the one or more items of anonymous personal identification information may also be stored in each of the cookies stored in the memory of the electronic device 110 and associated with domains from a matrix. While the transmitted one or more items of anonymous personal identification information may not include an electronic address, each of the cookies associated with the domains from the matrix includes the electronic address. In addition, the one or more items of anonymous personal identification information stored in each of the cookies associated with the domains in the matrix may also include the open-source software footprint. Thus, when the computing system 115 retrieves a cookie associated with a domain in the matrix from the memory of the electronic device 110, the computing system 115 maps or associates the open-source software footprint from the retrieved cookie to the electronic address from the retrieved cookie. Accordingly, the computing system 115 maps or associates the open-source software footprint with the specific electronic device 110.

In certain embodiments, the computing system 115, utilizing the at least one processor 205, retrieves an item of personal identification information that is attached to the open-source software footprint. For example, after the computing system 115 has mapped or associated the open-source software footprint from the retrieved cookie to the electronic address from the retrieved cookie and the computing system 115 has stored the electronic address and the one or more items of anonymous personal identification information from the retrieved cookie in the user profile in the server 120, the electronic device 110 may engage in a subsequent web browser session with a web browser 125 (e.g., the same web browser, another web browser). During the subsequent web browser session, the electronic device 110 may transmit one or more items of anonymous personal identification information to the web browser 125. The one or more items of anonymous personal notification information transmitted to the web browser 125 during the subsequent web browser session may be different items of anonymous personal identification information from the one or more items of anonymous personal identification information transmitted the web browser during the initial web browser session.

The one or more items of anonymous personal identification information transmitted from the electronic device 110 during the subsequent web browser session may include the open-source software footprint. The computing system 115 may intercept, receive, or retrieve the transmitted one or more items of anonymous personal identification information transmitted from the electronic device 110 during the subsequent web browser session and identify that the one or more items of anonymous personal identification information includes the open-source software footprint. The computing system 115 may then map or associate the one or more items of anonymous personal identification information transmitted by the electronic device 110 during the subsequent web browser session with the previously provided electronic address from the retrieved cookie based on the open-source software footprint. Based on mapping the electronic address with the open-source software footprint during the initial web browser session, the computing system 115 may identify that the electronic device 110 is the source of the one or more items of anonymous personal identification information transmitted during the subsequent web browser session without relying on a cookie.

In certain embodiments, the computing system 115, utilizing the at least one processor 205, stores the one or more items of anonymous personal identification information in the user profile in the server 120 based on the attached open-source software footprint. In certain embodiments, the computing system 115 stores the one or more items of anonymous personal identification information transmitted during the subsequent browser session in the user profile in the server 120 based on the attached open-source software footprint. For example, the computing system 115 may have determined that the one or more items of anonymous personal identification information transmitted during the subsequent web browser session is associated with the electronic device 110 that stored the retrieved cookie from the initial web browser session. The computing system 115 may store the one or more items of anonymous personal identification information in the same user profile that contains the electronic address and the one or more items of anonymous personal identification information contained in the retrieved cookie from the initial web browser session based on mapping or associating the open-source software footprint attached to the one or more items of anonymous personal identification information obtained during the subsequent web browser session with the electronic address stored in the user profile in the server 120. Accordingly, the computing system 115 may store items of anonymous personal identification information in user profiles associated with specific electronic devices 110 without relying on the ability of the computing system to retrieve cookies stored in the memories of the electronic devices 110.

In certain embodiments, the computing system 115, utilizing the at least one processor 205, accesses one or more servers to identify one or more client systems permitted to transmit data to the electronic device based on the electronic address. In certain embodiments, the one or more servers 120 may store a list of each of the one or more client systems 130 and one or more contractual permissions or contractual prohibitions for each of the one or more client system 130 with one or more other client systems 130. For example, the one or more servers 120 may include a list of a plurality of client systems 130 including a first client system, a second client system, and a third client system. In the list of the plurality of client systems 130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 110. Conversely, in the list of the plurality of client systems 130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece from the first electronic address or a data piece received through the first domain. Additionally, or alternatively, using the one or more servers 120, the computing system 115 may determine, based on the first electronic address or receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece from the first electronic address or a data piece received through the first domain. Additionally, or alternatively, using the one or more servers 120, the computing system 115 may determine, based on the first electronic address or receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 115 may transmit a received data piece containing the first electronic address or a received data piece that was received through the first domain to the first client system because the first client is contractually permitted to receive or is not contractually prohibited from receiving the data piece.

In certain embodiments, the computing system 115, using the one or more servers 120, may also determine that the third client system is not contractually permitted to receive or is contractually prohibited from receiving a data piece from the first electronic address or a data piece received through the first domain. Additionally, or alternatively, using the one or more servers 120, the computing system 115 may determine, based on the first electronic address or the first domain, that the third client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 115 may transmit a received data piece containing the first electronic address or a received data piece that was received through the first domain to the first client system because the first client system is contractually permitted to receive or is not contractually prohibited from receiving the data piece.

In certain embodiments, the one or more servers 120 may also contain a list of each of the one or more client systems 130 and one or more contractual permissions or contractual prohibitions for each of the one or more client system 130 with one or more domains. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from data pieces stored on an electronic device 110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 110.

Conversely, in the list of the plurality of client systems 130, the first client system may have contractual permission to receive or may not have contractual prohibition from receiving electronic addresses and items of anonymous personal identification information from data pieces stored on an electronic device 110 from a second domain. However, the second client system may not have contractual permission to receive or may have contractual prohibition from receiving electronic addresses and items of anonymous personal identification information from data pieces stored on an electronic device 110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 110 while the second client system may not be contractually permitted to use or may be contractually prohibited from using the received electronic addresses and items of anonymous personal identification information from the second domain or contained in data pieces from the second domain to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece through the first domain. Additionally, or alternatively, using the one or more servers 120, the computing system 115 may determine, based on receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece received through the first domain. Additionally, or alternatively, using the one or more servers 120, the computing system 115 may determine, based on receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece that was received through the first domain to the second client system because the first client system and the second client system are contractually permitted to share or are not contractually prohibited from sharing data pieces received by the other. In certain embodiments, the computing system 115 may transmit a received data piece that was received through the first domain to the first client system because the first client system is contractually permitted to receive or is not contractually prohibited from receiving the data piece.

In certain embodiments, the computing system 115, using the one or more servers 120, may also determine that the third client system is not contractually permitted to receive or is contractually prohibited from receiving a data piece from received through the first domain. Additionally, or alternatively, using the one or more servers 120, the computing system 115 may determine, based on receiving the data piece through the first domain, that the third client system is not contractually permitted to transmit or is contractually prohibited from transmitting content to an electronic device associated with the first electronic address and that is based on the received one or more items of anonymous personal identification information contained in the data piece. In certain embodiments, the computing system 115 may transmit a received data piece that was received through the first domain to the first client system because the first client system is contractually permitted to receive or is not contractually prohibited from receiving the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece that was received through the first domain to the second client system because the first client system and the third client system are not contractually permitted to share or are contractually prohibited from sharing data pieces received by the other.

In certain embodiments, the one or more servers 120 may also contain a list of each of the one or more client systems 130 that indicates one or more electronic device 110 that have given electronic permission to receive content from that client system 130. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from a first electronic device 110. Accordingly, both the first client system and the second client system may each be contractually permitted to use or may each not be contractually prohibited from using the received electronic addresses and items of anonymous personal identification information from the first electronic device to transmit content to electronic devices 110 (e.g., the first electronic device). Conversely, in the list of the plurality of client systems 130, the first client system may have contractual permission to receive or may not have contractual prohibition from receiving electronic addresses and items of anonymous personal identification information from a second electronic device 110. However, the second client system may not have contractual permission to receive or may have contractual prohibition from receiving electronic addresses and items of anonymous personal identification information from the second electronic device 110. Accordingly, the first client system may be contractually permitted to use or may not be contractually prohibited from using the received electronic addresses and items of anonymous personal identification information from the second electronic device 110 to transmit content to electronic devices 110 while the second client system may not be contractually permitted to use or may be contractually prohibited from using the received electronic addresses and items of anonymous personal identification information from the second electronic device 110 to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece from the first electronic address. Additionally, or alternatively, using the one or more servers 120, the computing system 115 may determine, based on the first electronic address, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece from the first electronic address. Additionally, or alternatively, using the one or more servers 120, the computing system 115 may determine, based on the first electronic address, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 115 may transmit a received data piece containing the first electronic address or a received data piece that was received through the first domain to the first client system because the first client system is contractually permitted or is not contractually prohibited from receiving the data piece.

In certain embodiments, the computing system 115, using the one or more servers 120, may also determine that the third client system is not contractually permitted to receive or is contractually prohibited from receiving a data piece from the first electronic address. Additionally, or alternatively, using the one or more servers 120, the computing system 115 may determine, based on the first electronic address, that the third client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 115 may transmit a received data piece containing the first electronic address to the first client system because the first client system is contractually permitted to receive or is not contractually prohibited from receiving the data piece.

It should be understood that the computing system 115, utilizing the at least one processor 205, is configured to contemporaneously and continuously receive millions or billions of data pieces from millions of electronic device 110. Each data piece may contains a plurality of items of anonymous personal identification information. The computing system 115, utilizing the at least one processor 205, is also configured to contemporaneously and continuously identify electronic addresses associated with each of the millions or billions of data pieces. The computing system 115, utilizing the at least one processor 205, is further configured to contemporaneously and continuously access one or more servers 120 to identify one or more client system 130 of a plurality of client systems 130 permitted to transmit data to the electronic device based on the electronic address. In addition, the computing system, utilizing the at least one processor 205, is configured to contemporaneously and continuously transmit the data piece to the one or more client systems 130 permitted to transmit data to the electronic device 110. Thus, the computing system 115, utilizing the at least one processor 205, gathers electronic addresses and items of anonymous personal identification information continuously and contemporaneously in real time determines which client systems are permitted to receive the electronic addresses and items of anonymous personal identification information, and transmit the most up-to-date information to the client systems and accordingly cannot be performed by human interaction.

Figure 3:
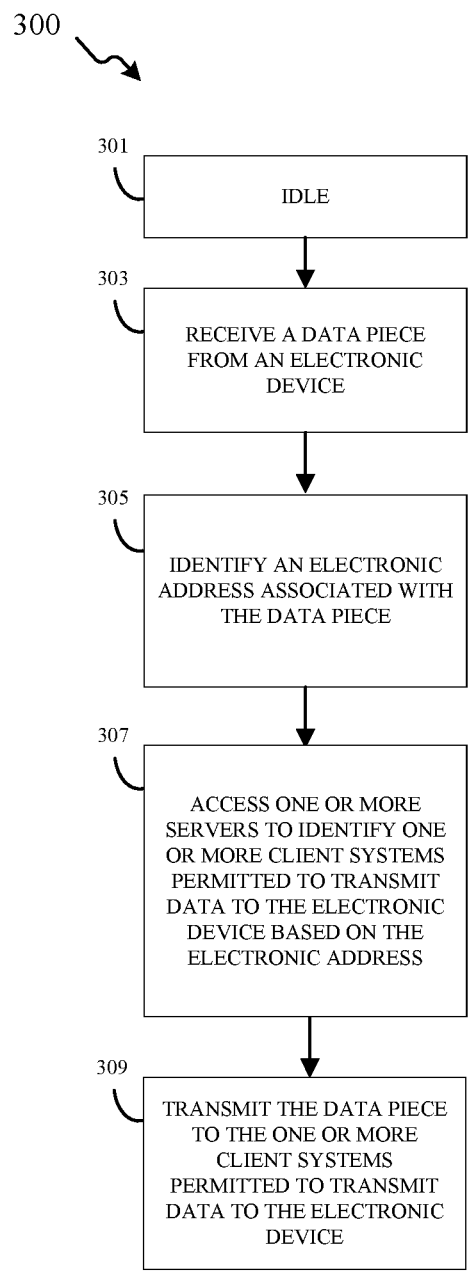
FIGS. 3-6 illustrate flow diagrams of methods for performing data piece transfer operations according to certain embodiments of the disclosure.

FIG. 3 illustrates a method 300 implemented by the computing system 115, utilizing the at least one processor 205, for performing data piece transfer operations according to certain embodiments of this disclosure. Although certain details will be provided with reference to the method 300 of FIG. 3, it should be understood that other embodiments may include more, less, or different method steps. At step 301, the computing system 115 is in an idle state at least with respect to performing data piece transfer operations. At step 303, the computing system 115 receives a data piece from an electronic device 110. The data piece may include one or more items of anonymous personal identification information. In certain embodiments, the one or more items of anonymous personal identification information may include at least one of an email address, a postal address, a user ID, a gender, an age group, a user interest, or the like.

In certain embodiments, after the data pieces are transmitted to the electronic device 110 and stored in the memory of electronic device 110, the computing system 115 attempts to retrieve or receive each of the data pieces stored in the memory of electronic device 110 (e.g., through each of the domains). In certain embodiments, the computing system 115 attempts to retrieve or receive each of the data pieces stored in the memory electronic device 110 regardless of whether the electronic device 110 has transmitted one or more items of anonymous personal identification information to the web browser 125. For example, after the computing system 115 has transmitted each of the data pieces through the domains to the electronic device 110 for storage in the memory of electronic device 110, the computing system 115 initiates a retrieval test to determine which, if any, data pieces the computing system 110 is able to retrieve. The retrieval test may allow the computing system 115 to determine which data pieces are not retrievable from the memory of electronic device 110 due to data piece blocking software and what data pieces are retrievable from the memory of the device 110. The retrieval test may be performed by attempting to retrieve an electronic address contained in each of the data pieces. Thus, the computing system 115 may determine which data pieces can be retrieved from the memory of electronic device 110 and which data pieces cannot be retrieved from the memory of the electronic device 110 regardless of whether the electronic device 110 has transmitted one or more items of anonymous personal identification information to the web browser 125. Subsequently, the computing system 115 may seek to retrieve or receive from the memory of electronic device 110 only those data pieces determined to be retrievable by the retrieval test for storage of an electronic address and one or more items of anonymous personal identification information for storage in the server 120.

In certain embodiments, the computing system 115 attempts to retrieve each of the data pieces stored in the memory of electronic device 110 after the electronic device 110 has transmitted one or more items of anonymous personal identification information to the web browser 125 (e.g., through each of the domains). For example, after the computing system 115 has transmitted each of the data pieces to the electronic device 110 for storage in the memory of electronic device 110 and after the electronic device 110 has transmitted one or more items of anonymous personal identification information to the web browser 125 during the web browser session, the computing system 115 initiates data piece retrieval to retrieve the data pieces associated with the each of the domains from a matrix and stored in the memory of electronic device 110. In response to initiating the data piece retrieval, the computing system 115 retrieves only some of the data pieces previously stored in the memory of electronic device 110. Based on determining which data pieces have been retrieved and which data pieces have not been retrieved, the computing system 115 determines which, if any, data pieces the computing system 110 is able to retrieve. Subsequently, the computing system 115 may seek to retrieve from the memory of the electronic device 110 only those data pieces determined to be retrievable and containing subsequently transmitted electronic addresses and items of anonymous personal identification information for storage in the server 120.

At step 305, the computing system 115 identifies an electronic address associated with the data piece. The electronic address may be contained in the received data piece. Additionally, or alternatively, the electronic address may contained in a user profile that has an item of anonymous personal identification information that matches an item of anonymous personal identification information contained in a received data piece. In certain embodiments, the electronic address includes at least one of a MAC address, an IMEI number, an electronic device serial number, a pointer associated with a data port of the electronic device, a combination thereof, or the like.

At step 307, the computing system 115 accesses one or more servers to identify one or more client systems permitted to transmit data to the electronic device based on the electronic address. In certain embodiments, the one or more servers 120 may store a list of each of the one or more client systems 130 and one or more contractual permissions or contractual prohibitions for each of the one or more client system 130 with one or more other client systems 130. For example, the one or more servers 120 may include a list of a plurality of client systems 130 including a first client system, a second client system, and a third client system. In the list of the plurality of client systems 130, the first client system and the second client system may have contractual permission or may not have contractual prohibition to share received electronic addresses and items of anonymous personal identification information with each other and may have contractual permission or may not have contractual prohibition to use the electronic addresses and items of anonymous personal identification information received from the other to transmit content to electronic devices 110. Conversely, in the list of the plurality of client systems 130, the first client system and the third client system may not have contractual permission to share or may have contractual prohibition from sharing received electronic addresses and items of anonymous personal identification information with each other and may not have contractual permission from using or may have contractual prohibition to use the electronic addresses and items of anonymous personal identification information received from the other to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece from the first electronic address or a data piece received through the first domain. Additionally, or alternatively, using the one or more servers 120, the computing system 115 may determine, based on the first electronic address or receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece from the first electronic address or a data piece received through the first domain. Additionally, or alternatively, using the one or more servers 120, the computing system 115 may determine, based on the first electronic address or receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 115 may transmit a received data piece containing the first electronic address or a received data piece that was received through the first domain to the first client system because the first client is contractually permitted to receive or is not contractually prohibited from receiving the data piece.

In certain embodiments, the computing system 115, using the one or more servers 120, may also determine that the third client system is not contractually permitted to receive or is contractually prohibited from receiving a data piece from the first electronic address or a data piece received through the first domain. Additionally, or alternatively, using the one or more servers 120, the computing system 115 may determine, based on the first electronic address or the first domain, that the third client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 115 may transmit a received data piece containing the first electronic address or a received data piece that was received through the first domain to the first client system because the first client system is contractually permitted to receive or is not contractually prohibited from receiving the data piece.

In certain embodiments, the one or more servers 120 may also contain a list of each of the one or more client systems 130 and one or more contractual permissions or contractual prohibitions for each of the one or more client system 130 with one or more domains. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from data pieces stored on an electronic device 110 from a first domain. Accordingly, both the first client system and the second client system may each be contractually permitted to use or may each not be contractually prohibited from using the received electronic addresses and items of anonymous personal identification information from the first domain or contained in data pieces from the first domain to transmit content to electronic devices 110.

Conversely, in the list of the plurality of client systems 130, the first client system may have contractual permission to receive or may not have contractual prohibition from receiving electronic addresses and items of anonymous personal identification information from data pieces stored on an electronic device 110 from a second domain. However, the second client system may not have contractual permission to receive or may have contractual prohibition from receiving electronic addresses and items of anonymous personal identification information from data pieces stored on an electronic device 110 from the second domain. Accordingly, the first client system may be contractually permitted to use or may not be contractually prohibited from using the received electronic addresses and items of anonymous personal identification information from the second domain or contained in data pieces from the second domain to transmit content to electronic devices 110 while the second client system may not be contractually permitted to use or may be contractually prohibited from using the received electronic addresses and items of anonymous personal identification information from the second domain or contained in data pieces from the second domain to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece through the first domain. Additionally, or alternatively, using the one or more servers 120, the computing system 115 may determine, based on receiving the data piece through the first domain, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece received through the first domain. Additionally, or alternatively, using the one or more servers 120, the computing system 115 may determine, based on receiving the data piece through the first domain, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece that was received through the first domain to the second client system because the first client system and the second client system are contractually permitted to share or are not contractually prohibited from sharing data pieces received by the other. In certain embodiments, the computing system 115 may transmit a received data piece that was received through the first domain to the first client system because the first client system is contractually permitted to receive or is not contractually prohibited from receiving the data piece.

In certain embodiments, the computing system 115, using the one or more servers 120, may also determine that the third client system is not contractually permitted to receive or is contractually prohibited from receiving a data piece from received through the first domain. Additionally, or alternatively, using the one or more servers 120, the computing system 115 may determine, based on receiving the data piece through the first domain, that the third client system is not contractually permitted to transmit or is contractually prohibited from transmitting content to an electronic device associated with the first electronic address and that is based on the received one or more items of anonymous personal identification information contained in the data piece. In certain embodiments, the computing system 115 may transmit a received data piece that was received through the first domain to the first client system because the first client system is contractually permitted to receive or is not contractually prohibited from receiving the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece that was received through the first domain to the second client system because the first client system and the third client system are not contractually permitted to share or are contractually prohibited from sharing data pieces received by the other.

In certain embodiments, the one or more servers 120 may also contain a list of each of the one or more client systems 130 that indicates one or more electronic device 110 that have given electronic permission to receive content from that client system 130. For example, the one or more servers 120 may include a list of a plurality of client systems 130 including a first client system and a second client system. In the list of the plurality of client systems 130, the first client system and the second client system may each have contractual permission to receive or may each not have contractual prohibition from receiving electronic addresses and items of anonymous personal identification information from a first electronic device 110. Accordingly, both the first client system and the second client system may each be contractually permitted to use or may each not be contractually prohibited from using the received electronic addresses and items of anonymous personal identification information from the first electronic device to transmit content to electronic devices 110 (e.g., the first electronic device). Conversely, in the list of the plurality of client systems 130, the first client system may have contractual permission to receive or may not have contractual prohibition from receiving electronic addresses and items of anonymous personal identification information from a second electronic device 110. However, the second client system may not have contractual permission to receive or may have contractual prohibition from receiving electronic addresses and items of anonymous personal identification information from the second electronic device 110. Accordingly, the first client system may be contractually permitted to use or may not be contractually prohibited from using the received electronic addresses and items of anonymous personal identification information from the second electronic device 110 to transmit content to electronic devices 110 while the second client system may not be contractually permitted to use or may be contractually prohibited from using the received electronic addresses and items of anonymous personal identification information from the second electronic device 110 to transmit content to electronic devices 110.

The computing system 115, utilizing one or more processors 205 to perform one or more data transfer operations, may receive a data piece containing a first electronic address and one or more items of anonymous personal identification information. The computing system 115 may identify the first electronic address contained within the data piece. The computing system 115 may also identify that the data piece was received through a first domain. Subsequently, using the one or more servers 120, the computing system 115 may determine that the first client system is contractually permitted to receive or is not contractually prohibited from receiving a data piece from the first electronic address. Additionally, or alternatively, using the one or more servers 120, the computing system 115 may determine, based on the first electronic address, that the first client system is contractually permitted to transmit or is not contractually prohibited from transmitting content to an electronic device associated with the first electronic address and that is based on the received one or more items of anonymous personal identification information contained in the data piece. The computing system 115, using the one or more servers 120, may also determine that the second client system is not contractually permitted to receive or is contractually prohibited from receiving a data piece from the first electronic address. Additionally, or alternatively, using the one or more servers 120, the computing system 115 may determine, based on the first electronic address, that the second client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the second client system are contractually permitted to share or are not contractually prohibited from sharing data pieces received by the other. Additionally, or alternatively, the computing system 115, utilizing one or more processors 205 to perform one or more data transfer operations, may access the one or more servers 120 and determine that the first client system and the second client system are contractually permitted to transmit or are not contractually prohibited from transmitting content to electronic devices associated with an electronic address contained in a data piece received by the other or transmit content based on one or more items of anonymous personal identification information contain in a data piece received by the other. Subsequently, the computing system 115 may transmit a received data piece containing the first electronic address or a received data piece that was received through the first domain to the second client system because the first client system and the second client system are contractually permitted to share or are not contractually prohibited from sharing data pieces received by the other. In certain embodiments, the computing system 115 may transmit a received data piece containing the first electronic address or a received data piece that was received through the first domain to the first client system because the first client system is contractually permitted or is not contractually prohibited from receiving the data piece.

In certain embodiments, the computing system 115, using the one or more servers 120, may also determine that the third client system is not contractually permitted to receive or is contractually prohibited from receiving a data piece from the first electronic address. Additionally, or alternatively, using the one or more servers 120, the computing system 115 may determine, based on the first electronic address, that the third client system is not contractually permitted to transmit or is contractually prohibited from transmitting content to an electronic device associated with the first electronic address and that is based on the received one or more items of anonymous personal identification information contained in the data piece.

The computing system 115, utilizing one or more processors 205 to perform one or more data transfer operations, may access the one or more servers 120 and determine that the first client system and the third client system are not contractually permitted to share or are contractually prohibited from sharing data pieces received by the other. Additionally, or alternatively, the computing system 115, utilizing one or more processors 205 to perform one or more data transfer operations, may access the one or more servers 120 and determine that the first client system and the third client system are not contractually permitted to transmit or are contractually prohibited from transmitting content to electronic devices associated with an electronic address contained in a data piece received by the other or transmit content based on one or more items of anonymous personal identification information contain in a data piece received by the other. Subsequently, the computing system 115 may not transmit a received data piece containing the first electronic address or a received data piece that was received through the first domain to the third client system because the first client system and the third client system are not contractually permitted to share or are contractually prohibited from sharing data pieces received by the other. In certain embodiments, the computing system 115 may transmit a received data piece containing the first electronic address to the first client system because the first client system is contractually permitted to receive or is not contractually prohibited from receiving the data piece.

At step 309, the computing system 115 transmits the data piece to the one or more client systems permitted to transmit data to the electronic device. The data piece may contain one or more items of anonymous personal identification information. Each of the client systems may use the received one or more items of anonymous personal identification information to generate content or for statistical analysis.

Figure 4:
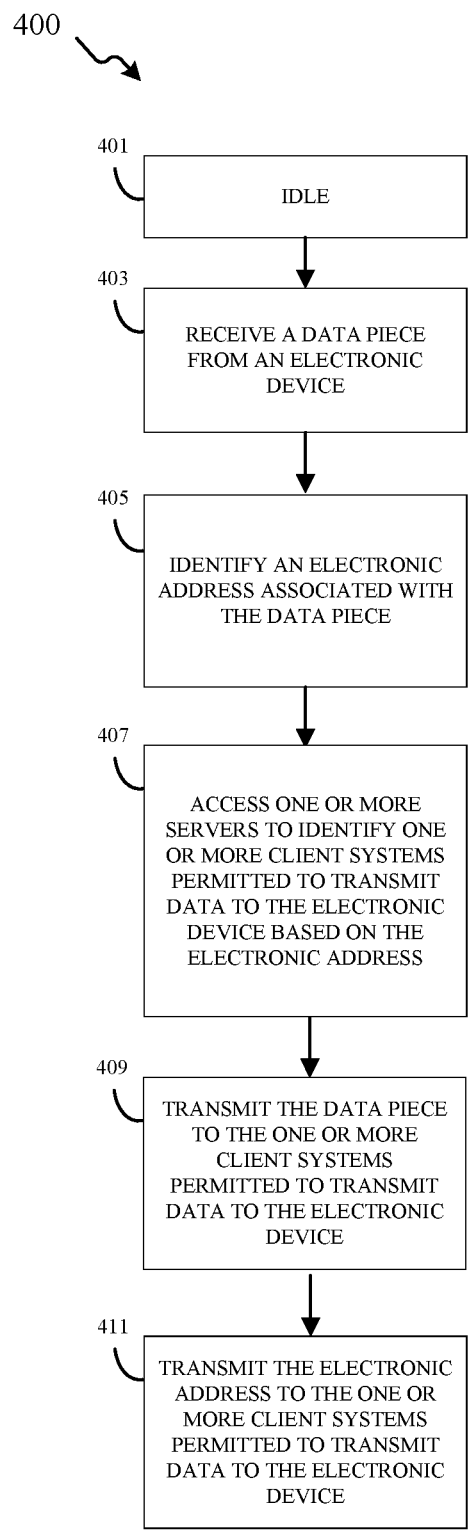

FIG. 4 illustrates a method 400 implemented by a computing system 115 for performing data piece transfer operations according to certain embodiments of this disclosure. Although certain details will be provided with reference to the method 400 of FIG. 4, it should be understood that other embodiments may include more, less, or different method steps. At step 401, the computing system 115 is in an idle state at least with respect to performing data piece transfer operations. Step 401 is at least similar to step 301 of method 300 illustrated in FIG. 3. At step 403, the computing system 115 receives a data piece from an electronic device. The data piece includes one or more items of anonymous personal identification information. Step 403 is at least similar to step 303 of method 300 illustrated in FIG. 3. At step 405, the computing system 115 identifies an electronic address associated with the data piece. Step 405 is at least similar to step 305 of method 300 illustrated in FIG. 3. At step 407, the computing system 115 accesses the one or more servers to identify one or more client systems permitted to transmit data to the electronic device based on the electronic address. Step 407 is at least similar to step 307 of method 300 illustrated in FIG. 3. At step 409, the computing system 115 transmits the data piece to the one or more client systems permitted to transmit data to the electronic device. Step 409 is at least similar to step 309 of method 300 illustrated in FIG. 3.

At step 411, the computing system 115 transmits the electronic address to the one or more client systems permitted to transmit data to the electronic device. The data piece may contain at least one of one or more items of anonymous personal identification information or an electronic address. Each of the client systems may use the received one or more items of anonymous personal identification information to generate content. Each of the client systems may use the received the electronic address to transmit the generated content to an electronic device 110 associated with the electronic address.

Figure 5:
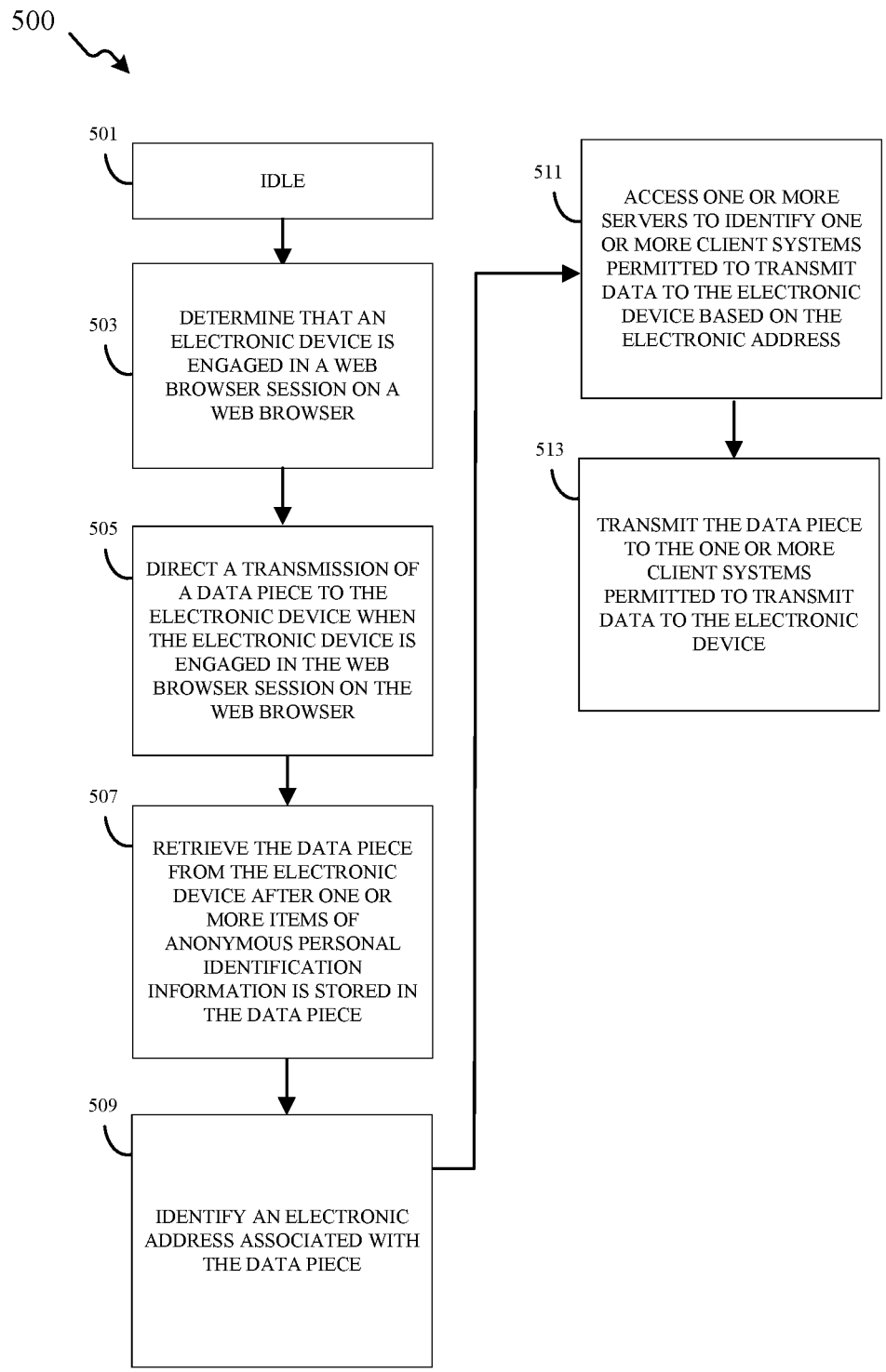

FIG. 5 illustrates a method 500 implemented by a computing system 115 for performing data piece transfer operations according to certain embodiments of this disclosure. Although certain details will be provided with reference to the method 500 of FIG. 5, it should be understood that other embodiments may include more, less, or different method steps. At step 501, the computing system 115 is in an idle state at least with respect to performing data piece transfer operations. Step 501 is at least similar to step 301 of method 300 illustrated in FIG. 3.

At step 503, the computing system 115 determines that an electronic device 110 is engaged in a web browser session on a web browser 125. The computing system 115 utilizing the one or more processors 125 may be configured to detect or determine that the electronic device 110 has initiated an engagement into a web browser session with a web browser 125, that the electronic device 110 is engaged in a web browser session with a web browser 125, or that an electronic device 110 has requested content from the web browser 125 while the electronic device 110 is engaged in a web browser session with the web browser 125. Upon engaging in the web browser session with the web browser 125, the electronic device 110 receives a data piece associated with the web browser 125 and stores the data piece in a memory of electronic device 110. The data piece received from the web browser 125 and stored in the memory of electronic device 110 includes an electronic address that is unique to the electronic device 110. As described herein, an electronic address may include at least one of a MAC address, an IMEI number, an electronic device serial number, a pointer associated with a data port of the electronic device, or the like. The data piece may be used for storing one or more items of anonymous personal identification information that is also transmitted during the browser session. It should be understood that the one or more items of anonymous personal identification information may include one or more of an email address, a postal address, a user ID, a gender, an age group, a user interest, or the like. In certain embodiments, each of the one or more items of anonymous personal identification information may include a hash value.

At step 505, the computing system 115 directs a transmission of a data piece to the electronic device 110 when the electronic device 110 is engaged in the web browser session of the web browser. The data piece may be associated with a domain that is linked to or associated with the web browser 125. In certain embodiments, a data piece may contain a first instruction to the electronic device 110. The first instruction may identify one or more domains in a first domain order identified in the matrix and instruct the electronic device 110 to initiate communication with those one or more domains. For example, after receiving the first instruction, the electronic device 110 may initiate communication with or transmit one or more items of anonymous personal identification information to a first domain of the one or more domains in first domain order indicated in the first instruction. After the computing system 115 successfully receives the electronic address and the one or more item of anonymous personal identification information stored in the data piece from a domain from the first domain order, a second instruction included in a data piece that was successfully received by computing system 115 from the electronic device 110 may instruct the electronic device 110 to initiate communication with or transmit one or more item of anonymous personal identification information to one or more domains in a second domain order indicated in the second instruction.

At step 507, the computing system 115 retrieves the data piece from the electronic device 110 after one or more items of anonymous personal identification information is stored in the data piece. For example, after the computing system 115 has transmitted a data piece to the electronic device 110 for storage in the memory of electronic device 110 and after the electronic device 110 has transmitted one or more items of anonymous personal identification information to the web browser 125 during the web browser session, the computing system 115 initiates data piece retrieval to retrieve the data pieces associated with the each of the domains from a matrix and stored in the memory of electronic device 110. In response to initiating the data piece retrieval, the computing system 115 retrieves at least some of the data pieces previously stored in the memory of electronic device 110. Based on determining which data pieces have been retrieved and which data pieces have not been retrieved, the computing system 115 determines which, if any, data pieces the computing system 110 is able to retrieve. Subsequently, the computing system 115 may seek to retrieve from the memory of the electronic device 110 only those data pieces determined to be retrievable and containing subsequently transmitted electronic addresses and items of anonymous personal identification information for storage in the server 120.

At step 509, the computing system 115 identifies an electronic address associated with the data piece. Step 509 is at least similar to step 305 of method 300 illustrated in FIG. 3. At step 511, the computing system 115 accesses the one or more servers to identify one or more client systems permitted to transmit data to the electronic device 110 based on the electronic address. Step 511 is at least similar to step 307 of method 300 illustrated in FIG. 3. At step 513, the computing system 115 transmits the data piece to the one or more client systems permitted to transmit data to the electronic device 110. Step 513 is at least similar to step 309 of method 300 illustrated in FIG. 3.

Figure 6:
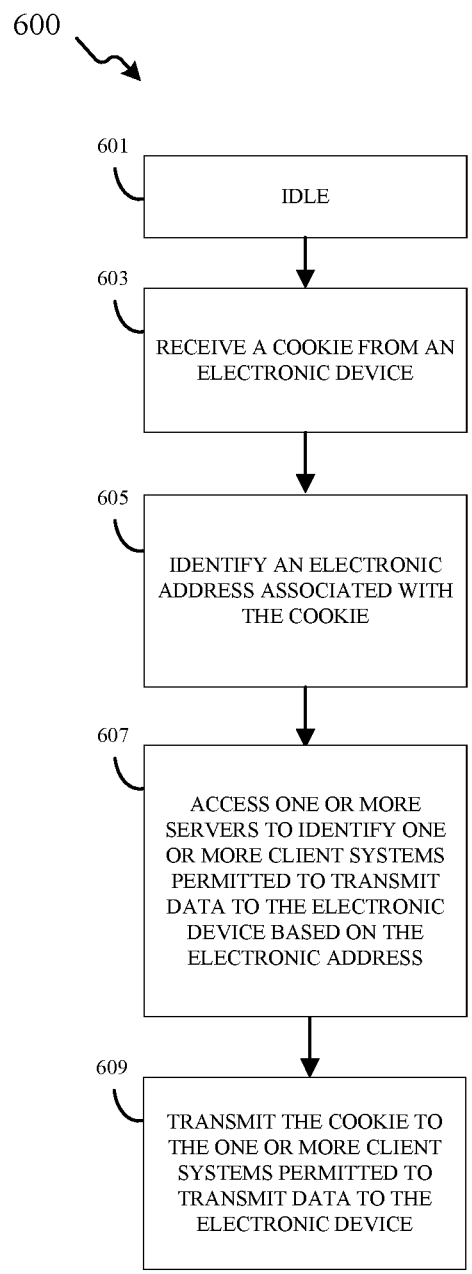

FIG. 6 illustrates a method 600 implemented by a computing system 115 for performing data piece transfer operations according to certain embodiments of this disclosure. Although certain details will be provided with reference to the method 600 of FIG. 6, it should be understood that other embodiments may include more, less, or different method steps. At step 601, the computing system 115 is in an idle state at least with respect to performing data piece transfer operations. Step 601 is at least similar to step 301 of method 300 illustrated in FIG. 3. At step 603, the computing system 115 receives a cookie from an electronic device 110. The cookie includes one or more items of anonymous personal identification information. Step 603 is at least similar to step 303 of method 300 illustrated in FIG. 3. At step 605, the computing system 115 identifies an electronic address associated with the cookie. Step 605 is at least similar to step 305 of method 300 illustrated in FIG. 3. At step 607, the computing system 115 accesses the one or more servers to identify one or more client systems permitted to transmit data to the electronic device 110 based on the electronic address. Step 607 is at least similar to step 307 of method 300 illustrated in FIG. 3. At step 609, the computing system 115 transmits the cookie to the one or more client systems permitted to transmit data to the electronic device 110. Step 609 is at least similar to step 309 of method 300 illustrated in FIG. 3.

Figure 7:
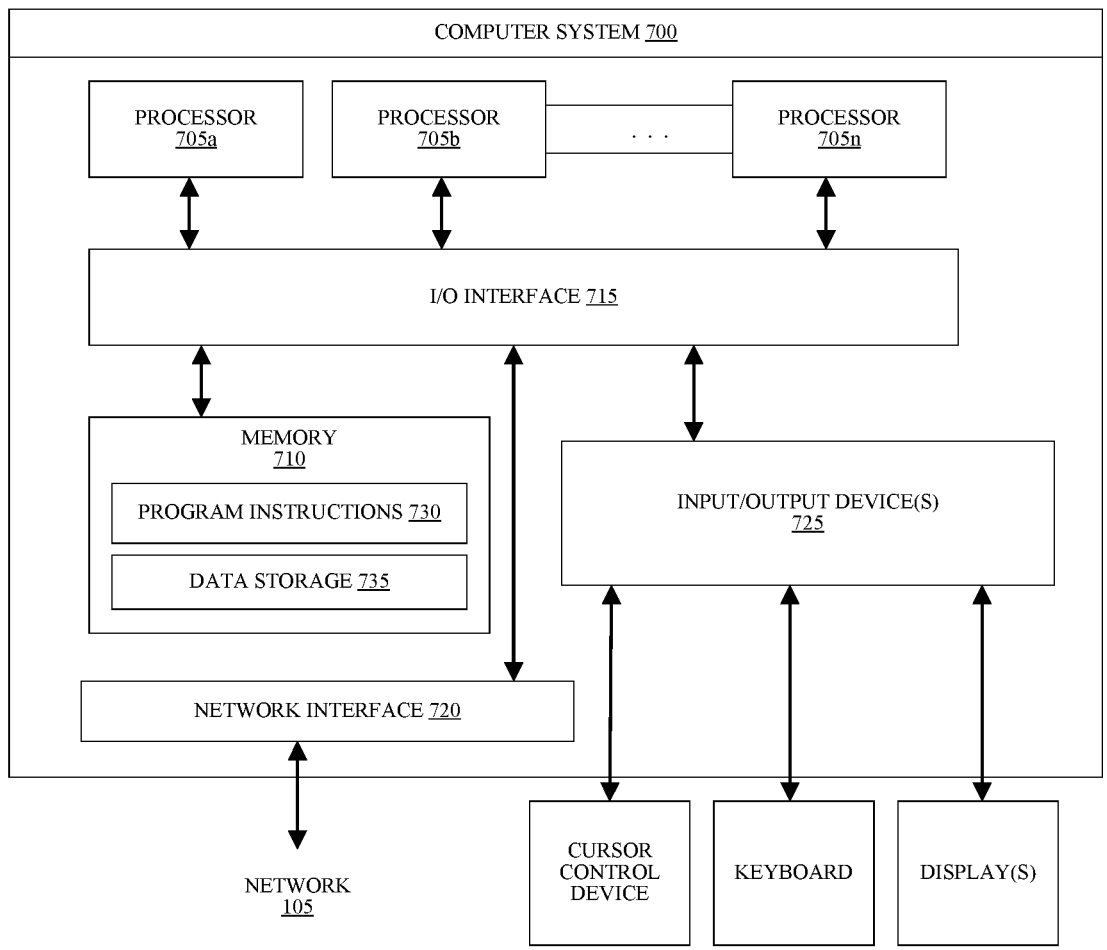
FIG. 7 illustrates a non-limiting, example computer system configured to implement aspects of systems and methods according to certain embodiments of this disclosure.

FIG. 7 illustrates a non-limiting, example computer system 700 configured to implement systems and methods for performing data piece transfer operations according to certain embodiments of this disclosure. FIG. 7 illustrates a computer system 700 that is configured to execute any and all of the embodiments described herein. In certain embodiments, the computer system 700 describes at least some of the components of computing system 115 illustrated in FIGS. 1 and 2. In certain embodiments, the computer system 700 describes at least some of the components of the one or more electronic devices 110, the one or more servers 120, electronics that provide the one or more web browsers 125, or at least some of the components of the one or more client systems 130 illustrated in FIG. 1. In different embodiments, the computer system 700 may be any of various types of devices, including, but not limited to, a computer embedded in a vehicle, a computer embedded in an appliance, a personal computer system, a desktop computer, a handset, a laptop computer, a notebook computer, a tablet, a slate, a netbook computer, a camera, a handheld video game device, a handheld computer, a video recording device, a consumer device, a portable storage device, a mainframe computer system, a workstation, network computer, a set top box, a video game console, a mobile device, an application server, a storage device, a television, a peripheral device such as a switch, a modem, a router, or in general any type of computing or electronic device.

Various embodiments of a system and method for performing data piece transfer operations, as described herein, may be executed on one or more computer systems 700, which may interact with various other devices. In the illustrated embodiment, the computer system 700 includes one or more processors 705 coupled to a system memory 710 via an input/output (I/O) interface 715. The computer system 700 further includes a network interface 720 coupled to I/O interface 715, and one or more input/output devices 725, such as cursor control device, keyboard, and display(s). In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 705a, or a multiprocessor system including several processors 705a-705n (e.g., two, four, eight, or another suitable number). The processors 705 may be any suitable processor capable of executing instructions. For example, in various embodiments the processors 705 may be general-purpose or embedded processors implementing any of a variety of instruction set architectures (ISAs), such as the x86, PowerPC, SPARC, or MIPS ISAs, or any other suitable ISA. In multiprocessor systems, each of processors 705 may commonly, but not necessarily, implement the same ISA.

The system memory 710 may be configured to store the program instructions 730 and/or existing state information and ownership transition condition data in the data storage 735 accessible by the processor 705. In various embodiments, the system memory 710 may be implemented using any suitable memory technology, such as static random access memory (SRAM), synchronous dynamic RAM (SDRAM), nonvolatile/Flash-type memory, or any other type of memory. In the illustrated embodiment, the program instructions 730 may be configured to implement a system for performing data piece transfer operations incorporating any of the functionality, as described herein. In some embodiments, program instructions and/or data may be received, sent, or stored upon different types of computer-accessible media or on similar media separate from the system memory 710 or the computer system 700. The computer system 700 is described as implementing at least some of the functionality of functional blocks of previous Figures.

In one embodiment, the I/O interface 715 may be configured to coordinate I/O traffic between the processor 705, the system memory 710, and any peripheral devices in the device, including the network interface 720 or other peripheral interfaces, such as the input/output devices 725. In some embodiments, the I/O interface 715 may perform any necessary protocol, timing or other data transformations to convert data signals from one component (e.g., the system memory 710) into a format suitable for use by another component (e.g., the processor 705). In some embodiments, the I/O interface 715 may include support for devices attached through various types of peripheral buses, such as a variant of the Peripheral Component Interconnect (PCI) bus standard or the Universal Serial Bus (USB) standard, for example. In some embodiments, the function of the I/O interface 715 may be split into two or more separate components, such as a north bridge and a south bridge, for example. Also, in some embodiments some or all of the functionality of the I/O interface 715, such as an interface to the system memory 710, may be incorporated directly into the processor 705.

The network interface 720 may be configured to allow data to be exchanged between the computer system 700 and other devices attached to the network 105 or between nodes of the computer system 700. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 725 may, in some embodiments, include one or more display terminals, keyboards, keypads, touchpads, scanning devices, voice, or optical recognition devices, or any other devices suitable for entering or accessing data by one or more the computer systems 700. Further, various other sensors may be included in the I/O devices 725, such as imaging sensors, barometers, altimeters, LIDAR, or any suitable environmental sensor. Multiple input/output devices 725 may be present in the computer system 700 or may be distributed on various nodes of the computer system 700. In some embodiments, similar input/output devices may be separate from the computer system 700 and may interact with one or more nodes of the computer system 700 through a wired or wireless connection, such as over the network interface 720.

As shown in FIG. 7, the memory 710 may include program instructions 730, which may be processor-executable to implement any element or action, as described herein. In one embodiment, the program instructions may implement at least a portion of methods described herein, such as the methods illustrated by FIGS. 3-6. In other embodiments, different elements and data may be included. Note that the data storage 735 may include any data or information, as described herein.

Those skilled in the art will appreciate that the computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 700 may be transmitted to the computer system 700 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus, comprising:
a computing system communicatively linked to one or more servers and comprising at least one memory and at least one processor, wherein the computing system is configured to:
receive a data piece from an electronic device, wherein the data piece comprises one or more items of anonymous personal identification information;
identify an electronic address associated with the data piece;
access the one or more servers to identify one or more client systems permitted to transmit data to the electronic device based on the electronic address; and
transmit the data piece to the one or more client systems permitted to transmit data to the electronic device.

2. The apparatus of claim 1, wherein the one or more items of anonymous personal identification information comprises at least one of an email address, a postal address, a user ID, a gender, an age group, or a user interest.

3. The apparatus of claim 1, wherein the electronic address comprises at least one of a MAC address, an IMEI number, an electronic device serial number, an email address, or a pointer associated with a data port of the electronic device.

4. The apparatus of claim 1, wherein the data piece is associated with a domain that is linked to a web browser, and wherein the one or more items of anonymous personal identification information are stored in the data piece when the electronic device is engaged in a web browser session on the web browser.

5. The apparatus of claim 1, wherein the computing system is further configured to:
transmit the electronic address to the one or more client systems permitted to transmit data to the electronic device.

6. The apparatus of claim 1, wherein the computing system is further configured to:
direct a transmission of the data piece to the electronic device, when the electronic device is engaged in a web browser session on a web browser, for storage in an electronic device memory, wherein the data piece is associated with a domain that is linked to the web browser; and
retrieve the data piece from the electronic device memory after the one or more items of anonymous personal identification information is stored in the data piece.

7. The apparatus of claim 6, wherein the computing system is further configured to:
determine that the electronic device is engaged in the web browser session on the web browser.

8. The apparatus of claim 1, wherein the data piece comprises a cookie.

9. The apparatus of claim 1, wherein each of the one or more items of anonymous personal identification information comprises a hash value.

10. A method implemented by a computing system, the method comprising:
receiving, by the computing system, a data piece from an electronic device, wherein the data piece comprises one or more items of anonymous personal identification information;
identifying, by the computing system, an electronic address associated with the data piece;
accessing, by the computing system, one or more servers to identify one or more client systems permitted to transmit data to the electronic device based on the electronic address; and
transmitting, by the computing system, the data piece to the one or more client systems permitted to transmit data to the electronic device.

11. The method of claim 10, wherein the one or more items of anonymous personal identification information comprises at least one of an email address, a postal address, a user ID, a gender, an age group, or a user interest.

12. The method of claim 10, wherein the electronic address comprises at least one of a MAC address, an MEIE number, an electronic device serial number, an email address, or a pointer associated with a data port of the electronic device.

13. The method of claim 10, wherein the data piece is associated with a domain that is linked to a web browser, and wherein the one or more items of anonymous personal identification information are stored in the data piece when the electronic device is engaged in a web browser session on the web browser.

14. The method of claim 10, further comprising:
transmitting, by the computing system, the electronic address to the one or more client systems permitted to transmit data to the electronic device.

15. The method of claim 10, further comprising:

directing, by the computing system, a transmission of the data piece to the electronic device, when the electronic device is engaged in a web browser session on a web browser, for storage in an electronic device memory, wherein the data piece is associated with a domain that is linked to the web browser; and retrieving, by the computing system, the data piece from the electronic device memory after the one or more items of anonymous personal identification is stored in the data piece.

16. The method of claim 15, further comprising:

determining, by the computing system, that the electronic device is engaged in the web browser session on the web browser.

\* \* \* \* \*